(12) United States Patent
Komada et al.

(10) Patent No.: US 8,257,213 B2
(45) Date of Patent: Sep. 4, 2012

(54) HYBRID DRIVING APPARATUS, AND CONTROL METHOD THEREOF

(75) Inventors: Hideaki Komada, Gotenba (JP); Yukihiko Ideshio, Susono (JP); Tooru Matsubara, Toyota (JP); Takashi Ohta, Toyota (JP); Hiroyuki Shibata, Toyota (JP); Hidehiro Oba, Aichi-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 752 days.

(21) Appl. No.: 12/281,039

(22) PCT Filed: Mar. 14, 2007

(86) PCT No.: PCT/IB2007/000623
§ 371 (c)(1),
(2), (4) Date: Aug. 28, 2008

(87) PCT Pub. No.: WO2007/110721
PCT Pub. Date: Oct. 4, 2007

(65) Prior Publication Data
US 2009/0011887 A1 Jan. 8, 2009

(30) Foreign Application Priority Data

Mar. 29, 2006 (JP) ................. 2006-091997
Jul. 5, 2006 (JP) ................. 2006-185887

(51) Int. Cl.
*F16H 3/72* (2006.01)
*F16H 37/06* (2006.01)
*B60W 10/04* (2006.01)
*B60W 10/10* (2012.01)

(52) U.S. Cl. .......................... 475/5; 477/115
(58) Field of Classification Search .......... 475/5; 477/3, 477/107, 109, 110, 111, 115
See application file for complete search history.

(56) References Cited

U.S. PATENT DOCUMENTS
5,669,842 A 9/1997 Schmidt
(Continued)

FOREIGN PATENT DOCUMENTS
EP 1 275 547 A 1/2003
(Continued)

OTHER PUBLICATIONS

Chinese Office Action dated Mar. 31, 2011 in corresponding Chinese Application No. 200780007208.4.

*Primary Examiner* — David D Le
*Assistant Examiner* — Michael Gonzalez
(74) *Attorney, Agent, or Firm* — Sughrue Mion, PLLC

(57) ABSTRACT

In a hybrid driving apparatus, a gear mechanism (3) having a first rotating element (7), a second rotating element (4) and a third rotating element (5) is provided, and a first driving power source (2), a second driving power source MG1 and a third driving power source MG2 are linked to the elements of the gear mechanism (3). The speed change ratio of the gear mechanism (3) can be altered. A driven member (18) to which the power output from an output element of the gear mechanism (3) is transmitted is provided. A first power transmission path (9) that connects the second driving power source MG1 to the driven member (18) is provided. A second power transmission path (17) that connects the third driving power source MG2 to the driven member (18) is provided. In this hybrid driving apparatus, at least one of the first power transmission path (9) and the second power transmission path (17) is provided with a transmission (19).

16 Claims, 10 Drawing Sheets

U.S. PATENT DOCUMENTS

| | | |
|---|---|---|
| 5,935,035 A | 8/1999 | Schmidt |
| 5,935,040 A * | 8/1999 | Tabata et al. .................. 477/3 |
| 6,558,283 B1 | 5/2003 | Schnelle |
| 7,128,677 B2 * | 10/2006 | Supina et al. ................. 475/5 |
| 7,367,415 B2 * | 5/2008 | Oliver et al. ............ 180/65.275 |
| 7,367,917 B2 * | 5/2008 | Sakamoto et al. ............. 477/5 |
| 7,479,081 B2 * | 1/2009 | Holmes ........................ 475/5 |
| 7,544,140 B2 * | 6/2009 | Tabata et al. ................. 475/5 |
| 2003/0013569 A1 | 1/2003 | Doepke |
| 2004/0166980 A1 * | 8/2004 | Supina et al. ................. 475/5 |
| 2005/0227801 A1 * | 10/2005 | Schmidt et al. ............... 475/5 |
| 2005/0227803 A1 | 10/2005 | Holmes |

FOREIGN PATENT DOCUMENTS

| | | |
|---|---|---|
| JP | 2000-69611 A | 3/2000 |
| JP | 2004-282886 A | 10/2004 |
| JP | 2005-125876 A | 5/2005 |
| JP | 2005-155891 A | 6/2005 |

* cited by examiner

FIG.2

| MODE | S1 | S2 | SR |
|---|---|---|---|
| 1st | DRIVEN GEAR 26 LINKED | × | × |
| 2nd | × | DRIVEN GEAR 31 LINKED | × |
| 3rd | DRIVEN GEAR 28 LINKED | × | × |
| 4th | × | DRIVEN GEAR 32 LINKED | × |
| Rev | × | × | ○ |

HYBRID DRIVING APPARATUS, AND CONTROL METHOD THEREOF

BACKGROUND OF THE INVENTION

1. Field of the Invention

The invention relates to a hybrid driving apparatus in which a plurality of driving power sources are power-transmittably linked to rotating elements of a gear mechanism capable of differential motion and to wheels, and a control method thereof.

2. Description of the Related Art

In a hybrid vehicle equipped with an internal combustion engine and a motor-generator as a plurality of driving power sources, it is possible to improve fuel economy and reduce exhaust gas while making the best of the characteristics of the engine and the motor-generator. An example of such hybrid vehicles having an internal combustion engine and a motor-generator as a plurality of driving power sources is described in Japanese Patent Application Publication No. JP-A-2005-125876.

The hybrid vehicle described in Japanese Patent Application Publication No. JP-A-2005-125876 has an engine, a first motor-generator and a second motor-generator. Besides, the hybrid vehicle is provided with a power distribution mechanism to which the engine, the first motor-generator and the second motor-generator are linked. This power distribution mechanism is made up of a planetary gear mechanism whose sun gear, that is, a reaction force element, is linked to the first motor-generator, and whose carrier, that is, an input element is linked to the engine and whose ring gear, that is, an output element, is linked to a first intermediate shaft. A path from the first intermediate shaft to axle shafts is provided with a clutch. On the other hand, the second motor-generator is linked to a first intermediate shaft gear via a speed reducer. This speed reducer is made up of a planetary gear mechanism. The second motor-generator is linked to the sun gear of the planetary gear, and the ring gear thereof is linked to the first intermediate shaft, and the carrier thereof is fixed. Furthermore, a second intermediate shaft is linked to the first motor-generator, and a path from the second intermediate shaft to the aforementioned axle shafts is provided with a clutch. Then, by controlling the engagement and release of the two clutches, the sun gear (reaction force element) or the ring gear (output element) of the power distribution mechanism can be selectively linked to the axle shafts. In consequence, a state where the power transmission loss is large, such as a power circulating state or the like, is avoided, according to the aforementioned patent application. A hybrid vehicle equipped with an internal combustion engine, a first motor-generator and a second motor-generator is also described in Japanese Patent Application Publication No. JP-A-2005-155891.

However, in the hybrid vehicle described in Japanese Patent Application Publication No. JP-A-2005-1255876, there is a need to improve the power transmission efficiency in a wider range of the region of running (a control range of the speed change ratio).

SUMMARY OF THE INVENTION

It is an object of the invention to provide a hybrid driving apparatus capable of improving power transmission efficiency over a wide range of the speed change ratio that is the ratio between the rotation speed of a first driving power source and the rotation speed of a driven member, and a control method thereof.

In a hybrid driving apparatus in accordance with an aspect of the invention, a gear mechanism having a first rotating element, a second rotating element and a third rotating element that are linked differentially rotatably is provided. A first driving power source is linked to the first rotating element, and a second driving power source is linked to the second rotating element, and a third driving power source is linked to the third rotating element. Furthermore, a driven member that transmits power output from an element of the gear mechanism to a wheel is provided. A first power transmission path that power-transmittably connects the second driving power source and the second rotating element to the driven member, and a second power transmission path that power-transmittably connects the third driving power source and the third rotating element to the driven member is provided. In this hybrid driving apparatus, at least one of the first power transmission path and the second power transmission path is provided with a transmission.

Given this, the power transmission efficiency can be improved over a wide range of the region of running of the vehicle and, concretely, over a wide range of the speed change ratio of the driving apparatus.

In the hybrid driving apparatus, both of the first power transmission path and the second power transmission path may be respectively provided with transmissions.

Given this, the control range of the speed change ratio of the driving apparatus can be altered in both the case where the second rotating element serves as a reaction force element and the energy obtained through the regenerative control of the second driving power source is supplied to the third driving power source and the case where the third rotating element serves as a reaction force element and the energy obtained through the regenerative control of the third driving power source is supplied to the second driving power source. Therefore, the control range of the speed change ratio of the driving apparatus where the power transmission efficiency can be improved further widens.

Furthermore, the transmission may have a first intermediate rotating member linked to the second rotating element and the second driving power source, and a second intermediate rotating member linked to the third rotating element and the third driving power source. The first intermediate rotating member and the second intermediate rotating member may be coaxially disposed, and a rotation axis of the first intermediate rotating member and the second intermediate rotating member, and a rotation axis of the driven member may be disposed in parallel, and a transmission device that links the first intermediate rotating member and the second intermediate rotating member to the driven member may be provided.

Given this, if the second rotating element serves as an output element, power output from the second rotating element is transmitted to the first intermediate rotating member, and power of the first intermediate rotating member is transmitted to the driven member via the first driving gear and the first driven gear. On the other hand, if the third rotating element serves as an output element, power output from the third rotating element is transmitted to the second intermediate rotating member, and power of the second intermediate rotating member is transmitted to the driven member via the second driving gear and the second driven gear. Furthermore, since the rotation axis of the first intermediate rotating member and the second intermediate rotating member, and the rotation axis of the driven member are disposed in parallel, the driving apparatus can be reduced in size in the direction of the rotation axis.

In the hybrid driving apparatus, the first rotating element, the second rotating element and the third rotating element making up the gear mechanism may include a sun gear and a ring gear that are coaxially disposed, and a carrier that supports pinion gears meshed with the sun gear and with the ring gear so that the pinion gears are rotatable about own axes thereof and are revolvable.

Given this, the power transmission efficiency can be improved over a wide range of the region of running of the vehicle and, concretely, over a wide range of the speed change ratio of the driving apparatus.

In the hybrid driving apparatus, the transmission device may be made of a driving gear provided on the first intermediate rotating member, and a driving gear provided on the second intermediate rotating member, and driven gears provided on the driven member, which are respectively meshed with the driving gears, and the second rotating element is the sun gear, and the sun gear and the driving gear are coaxially disposed.

Given this, the driving apparatus can be further reduced in size in the radial directions about the rotation axis.

Furthermore, in the hybrid driving apparatus, the third rotating element may be the ring gear, and the third driving power source may be provided annularly so as to surround an outside of the ring gear.

Given this, since the ring gear of the planetary gear mechanism and the third driving power source are disposed at the same position in the direction of the rotation axis, the driving apparatus can be reduced in size in the direction of the rotation axis.

Furthermore, in the hybrid driving apparatus, the gear mechanism may be made up so that the first rotating element serves as an input element, and so that one of the second rotating element and the third rotating element serves as a reaction force element and another one of the second rotating element and the third rotating element serves as an output element, and so that a speed change ratio between the rotating element that serves as the input element and the rotating element that serves as the output element is steplessly alterable by a differential operation of the first rotating element the second rotating element and the third rotating element.

Given this, power of the first driving power source is input to the first rotating element of the planetary gear mechanism, and one of the second rotating element and the third rotating element serves as a reaction force element, and the other serves as an output element. Power output from the output element is transmitted to the wheels via the driven member. For example, in the case where the second rotating element serves as a reaction force element and the third rotating element serves as an output element, power output from the third rotating element is transmitted to the driven member via the second power transmission path. On the other hand, in the case where the third rotating element serves as a reaction force element and the second rotating element serves as an output element, power output from the second rotating element is transmitted to the driven member via the first power transmission path. Besides, the regenerative control is performed on the driving power source that takes the reaction torque of the first driving power source, and regenerated energy is supplied to the driving power source connected to the rotating element that serves as the output element. The power transmission efficiency in the case where power of the first driving power source, the second driving power source and the third driving power source is transmitted to the driven member changes depending on the speed change ratio of the entire driving apparatus, that is, the ratio between the rotation speed of the first driving power source and the rotation speed of the driven member. Then, by selectively switching between a plurality of modes of the transmission provided on at least one of the first power transmission path and the second power transmission path, the control range of the speed change ratio of the transmission can be altered.

The hybrid driving apparatus may further have a construction as follows. That is, the gear mechanism may be made up of a single-pinion planetary gear mechanism that has a sun gear and a ring gear that are coaxially disposed, and a carrier that holds pinion gears meshed with the sun gear and with the ring gear. The first rotating element is the carrier, and the second rotating element is the sun gear, and the third rotating element is the ring gear. The transmission has a first intermediate rotating member and a second intermediate rotating member. The first intermediate rotating member is linked to the sun gear, and the second intermediate rotating member is linked to the ring gear. The first power transmission path is made up by meshing a plurality of first driving gears provided on the first intermediate rotating member and a plurality of first driven gears provided on the driven member, and the second power transmission path is made up by meshing a plurality of second driving gears provided on the second intermediate rotating member and a plurality of second driven gears provided on the driven member. A first transmission provided on the first power transmission path has a first clutch mechanism that connects one of the plurality of first driving gears to one of the plurality of first driven gears, and a second transmission provided on the second power transmission path has a second clutch mechanism that connects one of the plurality of second driving gears to one of the plurality of second driven gears.

Given this, by controlling the first clutch mechanism, the first intermediate rotating member and the driven member are power-transmittably connected. Similarly, by controlling the second clutch mechanism, the second intermediate rotating member and the driven member are power-transmittably connected.

The hybrid driving apparatus may further have a construction as follows. The gear mechanism is made up of a double-pinion planetary gear mechanism that has a sun gear and a ring gear that are coaxially disposed, first pinion gears meshed with the sun gear, second pinion gears meshed with the first pinion gears and with the ring gear, and a carrier that supports the first pinion gears and the second pinion gears. The first rotating element is the ring gear, and the second rotating element is the sun gear, and the third rotating element is the carrier. The transmission has a first intermediate rotating member and a second intermediate rotating member. The first intermediate rotating member is linked to the sun gear, and the second intermediate rotating member is linked to the carrier. The first power transmission path is made up by meshing a plurality of first driving gears provided on the first intermediate rotating member and a plurality of first driven gears provided on the driven member, and the second power transmission path is made up by meshing a plurality of second driving gears provided on the second intermediate rotating member and a plurality of second driven gears provided on the driven member. A first transmission provided on the first power transmission path has a first clutch mechanism that connects one of the plurality of first driving gears to one of the plurality of first driven gears, and a second transmission provided on the second power transmission path has a second clutch mechanism that connects one of the plurality of second driving gears to one of the plurality of second driven gears.

Given this, by controlling the first clutch mechanism, the first intermediate rotating member and the driven member are power-transmittably connected. Similarly, by controlling the second clutch mechanism, the second intermediate rotating member and the driven member are power-transmittably connected.

The hybrid driving apparatus, when controlling the speed change ratio between rotation speed of the first driving power source and rotation speed of the driven member by controlling the speed change ratio between an input element and an output element of the gear mechanism, may execute a control of the speed change ratio of the transmission in parallel with a control of the speed change ratio of the gear mechanism so as to selectively switch between a plurality of drive modes having different control ranges of the speed change ratio between the rotation speed of the first driving power source and the rotation speed of the driven member. Furthermore, the hybrid driving apparatus may have a mode switching manner selection means for selecting a first mode switching manner of switching between the plurality of drive modes while keeping constant the rotation speed of the first driving power source.

Given this, the switching between the plurality of drive modes can be performed while rise in the rotation speed of the first driving power source is restrained.

The mode switching manner selection means may include means for judging whether a predetermined output of the first driving power source is high or low, and for selecting the first mode switching manner based on a result of judgment.

Given this, the switching between the plurality of drive modes can be performed while rise in the rotation speed of the first driving power source is restrained.

Furthermore, the mode switching manner selection means may include means of selecting a second mode switching manner that has a characteristic of switching between the plurality of drive modes while raising the rotation speed of the first driving power source. The mode switching manner selection means may select the first mode switching manner when the output of the first driving power source is high, and may select the second mode switching manner when the output of the first driving power source is low.

Given this, when the output of the first driving power source is high, rise in the rotation speed of the first driving power source can be restrained. When the output of the first driving power source is low, the power transmission efficiency can be further improved.

The hybrid driving apparatus may further have a construction as follows. A first transmission is provided on the first power transmission path, and a second transmission is provided on the second power transmission path. The speed change ratio selected by the first transmission and the speed change ratio selected by the second transmission are different. A third clutch mechanism is provided in one of a place between the first driving power source and the first rotating element, a place between the second driving power source and the second rotating element, and a place between the third driving power source and the third rotating element.

Given this, it becomes possible to connect one of the first or second clutch mechanism provided on the first power transmission path or the second power transmission path respectively, and cut off the clutch mechanism provided on the other power transmission path, and select a predetermined speed change ratio by the transmission provided on the connected one of the power transmission paths, and stop the first driving power source. Then, if the third clutch mechanism is released, it is possible to cut off the connected one of the power transmission paths and connect the cut-off one of the power transmission paths while keeping the first driving power source stopped, and select a speed change ratio that is different from the predetermined speed change ratio, by the transmission provided on the newly connected one of the power transmission paths.

Another aspect of the invention is a control method of a hybrid driving apparatus having:
a gear mechanism that has a first rotating element, a second rotating element and a third rotating element that are linked differentially rotatably;
a first driving power source linked to the first rotating element;
a second driving power source linked to the second rotating element;
a third driving power source linked to the third rotating element;
a driven member that transmits power output from an element of the gear mechanism to a wheel;
a first power transmission path that power-transmittably connects the second driving power source and the second rotating element to the driven member;
a second power transmission path that power-transmittably connects the third driving power source and the third rotating element to the driven member; and
a transmission provided on at least one of the first power transmission path and the second power transmission path. The control method comprises:
the step of judging whether a predetermined output of the first driving power source is high or low;
the step of performing a control of the speed change ratio of the gear mechanism based on a result of judgment;
the step of selecting one of a first mode switching manner and a second mode switching manner based on the result of judgment; and
the step of switching the speed change ratio of the transmission based on a result of selection.

Given this, the power transmission efficiency can be improved over a wide range of the region of running of the vehicle and, concretely, over a wide range of the speed change ratio of the driving apparatus.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a table showing the working of clutch mechanisms in shift control modes of a transmission 19 shown in FIG. 1;

DETAILED DESCRIPTION OF THE PREFERRED EMBODIMENTS

Figure 1:
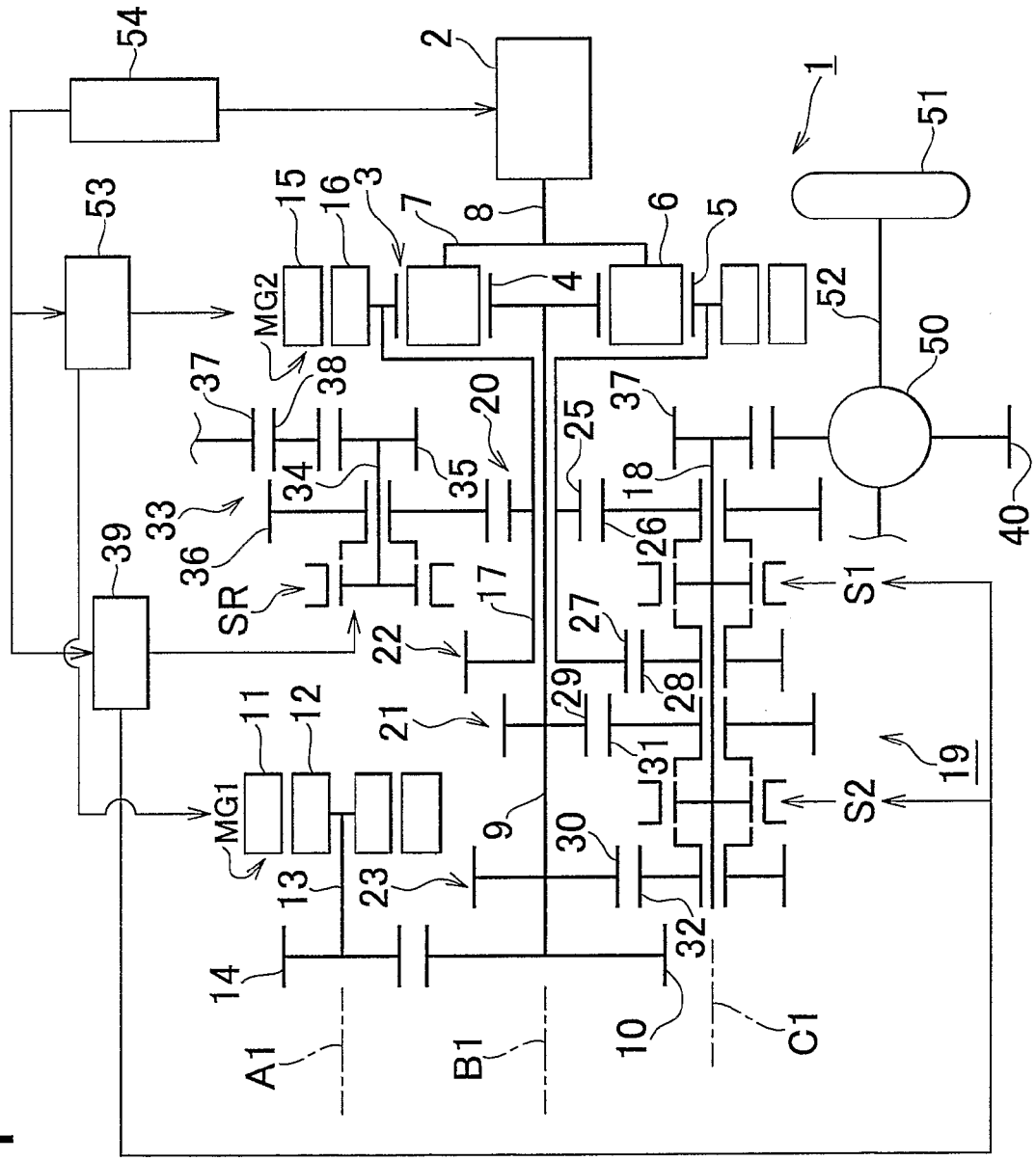
FIG. 1 is a conceptual diagram showing an embodiment of a power train and a control system of a vehicle that has a hybrid driving apparatus of the invention.

The invention can be used in a vehicle (hybrid vehicle) that has a plurality of driving power sources, and more concretely, has a first driving power source, a second driving power source, and a third driving power source. These driving power sources are power units that generate power to be transmitted to wheels. It is to be noted herein that the "plurality" means plurality in number of pieces. Besides, it is also possible to use power units of different power generation principles as the plurality of driving power sources. For example, it is possible that the power generation principle of the first driving power source and the power generation principle of the second driving power source and the third driving power source may be different. Examples of driving power sources of different principles of power generation include an engine, an electric motor, a hydraulic motor, a fly wheel system, etc. The engine is a power unit that converts thermal energy into kinetic energy. The electric motor is a power unit that converts electric energy into kinetic energy. The hydraulic motor is a power unit that converts energy (pressure, amount of flow) of a fluid (pressure oil) into mechanical energy (torque, rotation speed). The fly wheel system is a power unit that accumulates kinetic energy and releases it. Then, a construction is provided such that energy is given and received between one of the first, second and third driving power sources, and another driving power source.

In particular, as the first driving power source, it is permissible to use an internal combustion engine that is a power unit that generates thermal energy by burning fuel and converts thermal energy into kinetic energy may be used. More concretely, as the internal combustion engine, it is permissible to use a gasoline engines a diesel engine, an LPG engine, a methanol engine, etc. On the other hand, as the second driving power source and the third driving power source, it is possible to use electric motors. The electric motor is a power unit that converts electric energy into kinetic energy. The electric motor may be either a direct-current electric motor or an alternating-current electric motor. Furthermore, as the electric motor, it is permissible to use a motor-generator that is equipped with an electric power generating function as well.

In this embodiment, the first driving power source, the second driving power source and the third driving power source are linked to a gear mechanism, and more concretely, to a first rotating element, a second rotating element and a third rotating element of a planetary gear mechanism. The first rotating element functions as an input element, and one of the second rotating element and the third rotating element serves as a reaction force element, and the other one serves as an output element. Specifically, when power of the first driving power source is input to the input element, and is output from the output element, one of the second driving power source and the third driving power source takes the reaction force of the first driving power source. Furthermore, it is also possible that power of a driving power source other than the driving power source that takes the reaction force may be transmitted to the driven member. For example, it is possible that a motor-generator that is the second driving power source may perform a regenerative control, and the generated electric power may be supplied to another motor-generator that is the third driving power source to perform a power running control.

The transmission is a mechanism capable of altering the speed change ratio that is a ratio between the input rotation speed and the output rotation speed. A stepped transmission capable of altering the speed change ratio stepwise (non-continuously), a stepless transmission capable of altering the speed change ratio steplessly (continuously), etc. may be used. As the stepped transmission, for example, a selective gear transmission, a planetary gear transmission, etc. may be used. On the other hand, as the stepless transmission, it is possible to use a toroidal stepless transmission, a belt stepless transmission, etc. The power transmission devices in the embodiment include a gear power transmission device, a wrapping power transmission device, a traction power transmission device, etc. It is possible that at least one of a first power transmission path and a second power transmission path may be provided with a transmission. That is, one of the power transmission paths may be provided with a transmission, or both of the power transmission paths may be provided with transmissions. In addition, the two power transmission paths may be provided separately with transmissions, or the two power transmission paths may be provided with one common transmission.

In the embodiment, in the case where the first power transmission path is provided with a first transmission and the second power transmission path is provided with a second transmission, the speed change ratio selected by the first transmission and the speed change ratio selected by the second transmission are different. Furthermore, in the case where the first transmission and the second transmission are provided, it is also possible to provide a third clutch mechanism in one of a path between the first driving power source and the first rotating element, a path between the second driving power source and the second rotating element, and a path between the third driving power source and the third rotating element. In the embodiment, the third clutch mechanism is a mechanism that controls the transmission torque, and is able to connect a power transmission path extending from the first driving power source to the first transmission and the second transmission, and cut off the power transmission path extending from the first driving power source to the first transmission and the second transmission.

The first clutch mechanism, the second clutch mechanism and the third clutch mechanism are mechanisms that control the transmission torque, in other words, mechanisms that connect and cut off the power transmission paths. It is possible to use, for example, mesh clutches, electromagnetic clutches, friction clutches, etc. A first intermediate rotating member, a second intermediate rotating member and a driven member are component members that transmit power of the driving power sources to wheels. These members include rotating shafts (hollow shafts, solid shafts), connecting drums, gears, etc. Besides, in the embodiment, the case where the output of the first driving power source is high and the case where the output of the first driving power source is low indicate a relatively high-low relationship between the outputs of the first driving power source. A reference value that serves as a boundary between low outputs and high outputs is a design matter, and may be a fixed value or a variable value. Furthermore, the rotation axis of each rotating element may be disposed either in the width direction of the vehicle or the longitudinal direction of the vehicle. The embodiment is applicable to two-wheel drive vehicles in which power of each driving power source is transmitted to the front wheels or to the rear wheels alone, and also applicable to four-wheel drive vehicles in which power of each driving power source is transmitted both the front wheels and the rear wheels.

Embodiment 1

Next, the embodiment will be concretely described with reference to the drawings. FIG. 1 shows an example of the construction of a power train of a vehicle 1. The vehicle 1 shown in FIG. 1 is a hybrid vehicle of an FF (front engine, front wheel drive, front engine-mounted front wheel drive) type. In the vehicle 1 shown in FIG. 1, an engine 2 that is a type of internal combustion engine and a motor-generator MG1 and a motor-generator MG2 are installed as driving power sources. The engine 2 is a power unit that burns a fuel and converts thermal energy into kinetic energy. The engine 2 has an intake/exhaust device, a fuel injection device, etc. The engine output thereof, that is, the engine rotation speed and the engine torque, can be controlled by, for example, controlling the degree of opening of an electronic throttle valve, the amount of fuel injection, the fuel injection timing, etc. Besides, each of the motor-generators MG1, MG2 is a rotational device that has both a power running function of converting electric energy into kinetic energy, and a regenerative function of converting kinetic energy into electric energy.

A power distribution device 3 to which the engine 2 and the motor-generators MG1, MG2 are power-transmittably linked is provided. The power distribution device 3 is made up of a single-pinion planetary gear mechanism. Concretely, the power distribution device 3 has a sun gear 4, a ring gear 5 that is disposed coaxially with the sun gear 4 in so as to surround the sun gear 4, pinion gears 6 meshed with the sun gear 4 and with the ring gear 5, and a carrier 7 that supports the pinion gears 6 so that the pinion gears 6 are rotatable about their own axes and also revolvable. In this manner, the sun gear 4, the ring gear 5 and the carrier 7 are combined so as to be differentially rotatable relatively to each other.

The linking structures of the engine 2 and the motor-generators MG1, MG2 to rotating elements of the power distribution device 3 will be described. Firstly, the carrier 7 is power-transmittably linked to a crankshaft 8 of the engine 2. Besides, an input shaft 9 that rotates together with the sun gear 4 is provided. The input shaft 9 is disposed with the crankshaft 8 of the engine 2. The input shaft 9 is provided with a driven gear 10. On the other hand, the motor-generator MG1 has a stator 11 and a rotor 12. The stator 11 is fixed to a casing (not shown). A rotation shaft 13 is linked to the rotor 12 so that the rotation axis A1 of the rotation shaft 13 and the rotation axis B1 of the input shaft 9 are disposed in parallel. In this embodiment, the rotation axes A1, B1 are disposed in the width direction of the vehicle 1. Besides, the rotation shaft 13 is provided with a driving gear 14. The driving gear 14 and the driven gear 10 are meshed with each other. The driving gear 14 and the driven gear 10 make up a speed reduction mechanism. Specifically, in the case where torque of the motor-generator MG1 is transmitted to the input shaft 9, the rotation speed of the input shaft 9 is lower (reduced) than the rotation speed of the rotation shaft 13. The motor-generator MG2 has a stator 15 and a rotor 16. The motor-generator MG2 is made up annularly so as to surround the outside of the power distribution device 3 (an outside thereof in radial directions about the rotation axis B1). The motor-generator MG2 and the power distribution device 3 are disposed between the engine 2 and the motor-generator MG1 in the direction of the rotation axis of the input shaft 9. The stator 15 is fixed to the casing. Besides, the rotor 16 is linked to the ring gear 5 so that they rotate together.

An input shaft 17 linked to the rotor 16 of the motor-generator MG2 is provided. The input shaft 17 is formed so as to be hollow. The input shaft 9 is disposed within the input shaft 17. That is, the two input shafts 9, 17 are relatively rotatable about the common rotation axis B1. In addition, the input shaft 9 is longer than the input shaft 17. A counter shaft 18 is provided so as to be rotatable about a rotation axis C1 that is disposed in parallel with the rotation axis A1. A transmission 19 is provided between the two input shafts 9, 17 and the counter shaft 18. The transmission 19 is constructed so as to be able to alter the ratio in rotation speed, that is the speed change ratio, between the input shafts 9, 17 and the counter shaft 18. The transmission 19 has a first-speed gear pair 20, a second-speed gear pair 21, a third-speed gear pair 22, and a fourth-speed gear pair 23. The first-speed gear pair 20 has a first-speed driving gear 25 and a first-speed driven gear 26 that are meshed with each other. Besides, the third-speed gear pair 22 has a third-speed driving gear 27 and a third-speed driven gear 28 that are meshed with each other. The first-speed driving gear 25 and the third-speed driving gear 27 are provided so as to rotate together with the input shaft 17.

The first-speed driven gear 26 and the third-speed driven gear 28 are attached to the counter shaft 18 so as to be relatively rotatable thereto. Besides, the second-speed gear pair 21 has a second-speed driving gear 29 and a second-speed driven gear 31 that are meshed with each other. The fourth-speed gear pair 23 has a fourth-speed driving gear 30 and a fourth-speed driven gear 32 that are meshed with each other. The second-speed driving gear 29 and the fourth-speed driving gear 30 are linked to the input shaft 9 so that they rotate together. On the other hand, the second-speed driven gear 31 and the fourth-speed driven gear 32 are attached to the counter shaft 18 so as to be relatively rotatable thereto. As for the speed change ratios of the counter shaft 18 to the input shafts 9, 17, the speed change ratio of the first-speed gear pair 20 is the largest, and the speed change ratio of the second-speed gear pair 21 is smaller than the speed change ratio of the first-speed gear pair 20, and the speed change ratio of the third-speed gear pair 22 is smaller than the speed change ratio of the second-speed gear pair 21, and the speed change ratio of the fourth-speed gear pair 23 is smaller than the speed change ratio of the third-speed gear pair 22.

Next, a clutch mechanism that power-transmittably links the first to fourth-speed gear pairs 20 to 23 to the counter shaft 18 and cuts them from it will be described. Firstly, a first clutch mechanism S1 is provided. By this first clutch mechanism S1, the power transmission state of the first-speed gear pair 20 and the third-speed gear pair 22 is controlled. The first clutch mechanism S1 has a construction that power-transmittably links either one of the first-speed driven gear 26 and the third-speed driven gear 28 to the counter shaft 18, or let neither the first-speed driven gear 26 nor the third-speed driven gear 28 be in a state where power is transmittable to the counter shaft 18. As the first clutch mechanism S1, it is possible to use, for example, a meshing clutch such as a dog clutch or the like. In this embodiment, a clutch mechanism having a synchronization mechanism (synchronizer mechanism) that makes the rotation speed of the first-speed driven gear 26 or the third-speed driven gear 28 equal to the rotation speed of the counter shaft 18 is used.

Furthermore, a second clutch mechanism S2 is provided. By the second clutch mechanism S2, the power transmission state of the second-speed gear pair 21 and the fourth-speed gear pair 23 is controlled. The second clutch mechanism S2 has a construction that power-transmittably links either one of the second-speed driven gear 31 and the fourth-speed driven gear 32 to the counter shaft 18, or let neither the second-speed driven gear 31 nor the fourth-speed driven gear 32 be in a state where power is transmittable to the counter shaft 18. As the second clutch mechanism S2, it is possible to use, for example, a meshing clutch such as a dog clutch or the like. In this embodiment, a clutch mechanism having a synchronization mechanism (synchronizer mechanism) that makes the rotation speed of the second-speed driven gear 31 or the fourth-speed driven gear 32 to the rotation speed of the counter shaft 18 is used.

Furthermore, a backward-travel gear train 33 provided between the input shaft 17 and the counter shaft 18 will be described. Firstly, a backward-travel intermediate shaft 34 is provided in parallel to the input shaft 17. This backward-travel intermediate shaft 34 is provided with a backward-travel intermediate gear 35 so that the shaft 34 and the gear 35 rotate together, and is further provided with a backward-travel intermediate gear 36 that rotates relatively to the backward-travel intermediate shaft 34. The backward-travel intermediate gear 36 is meshed with the first-speed driving gear 25. On the other hand, the counter shaft 18 is provided with final pinion gears 37. A linkage gear 38 that meshes with the backward-travel intermediate gear 35 and with the final pinion gears 37 is provided. Furthermore, a backward-travel clutch mechanism SR is provided. By the backward-travel clutch mechanism SR, the state of power transmission of the backward-travel intermediate gear 36 with respect to the backward-travel intermediate shaft 34 is controlled. The backward-travel clutch mechanism SR has a construction that power-transmittably links the backward-travel intermediate gear 36 to the backward-travel intermediate shaft 34, and that causes the backward-travel intermediate gear 36 to be in a state where power is not transmittable to the backward-travel intermediate shaft 34. As the backward-travel clutch mechanism SR, it is possible to use, for example, a meshing clutch such as a dog clutch or the like. In this embodiment, a clutch mechanism having a synchronization mechanism (synchronizer mechanism) that makes the rotation speed of the backward-travel intermediate gear 36 equal to the rotation speed of the backward-travel intermediate shaft 34 is used. Furthermore, an actuator 39 that controls the first and second clutch mechanisms S1, S2 and the backward-travel clutch mechanism SR is provided. As this actuator 39, it is possible to use a hydraulically controlled actuator, an electromagnetically controlled actuator, etc.

A ring gear 40 that meshes with the final pinion gears 37 is provided. The final pinion gears 37 and the ring gear 40 make up a final speed reducer. Besides, the ring gear 40 is constructed so as to rotate together with the differential case 50. The differential case 50 and wheels (front wheels) 51 are power-transmittably linked to a drive shaft 52. Furthermore, an electric power supply device that gives electric power to and receives electric power from the aforementioned motor-generators is provided. The electric power supply device 53 has an electricity storage device (not shown) such as a secondary battery or the like. As the electricity storage device, a battery or a capacitor may be used. This electricity storage device and the motor-generators MG1, MG2 are interconnected via an inverter (not shown). Besides, the electric power supply device 53 may also be equipped with a fuel cell system (not shown) in addition to the electricity storage device. The fuel cell system is a system that obtains electromotive force by reacting hydrogen and oxygen, and is capable of supplying generated electric power to the motor-generators MG1, MG2 or charging it into the electricity storage device. Furthermore, the electric power supply device 53 has an electric circuit that connects the motor-generator MG1 and the motor-generator MG2. Therefore, electric power can be given and received directly between the motor-generator MG1 and the motor-generator MG2 without passage through the electricity storage device.

Next, the control system of the vehicle will be described. An electronic control device 54 as a controller is provided. The electronic control device 54 receives inputs of detection signals of various sensors and switches and the like, for example, an acceleration request, a braking request, the engine rotation speed, the rotation speeds of the motor-generators MG1, MG, the rotation speeds of the input shafts 9, 17, the rotation speed of the counter shaft 18, etc. The electronic control device 54 outputs a signal for controlling the engine 2, signals for controlling the motor-generators MG1, MG, signals showing the state of electric power generation, the state of charge, the state of discharge, etc. of the electric power supply device 53, a signal for controlling the actuator 39, etc.

In the vehicle 1 shown in FIG. 1, a control is executed in which engine torque is input to the carrier 7 of the power distribution device 3, and the reaction force of engine torque is taken by one of the motor-generators. Concretely, in the case where the reaction force is taken by the motor-generator MG1 linked to the sun gear 4, the ring gear 5 serves as an output element of the power distribution device 3. On the other hand, in the case where the reaction force is taken by the motor-generator MG2 linked to the ring gear 5, the sun gear 4 serves as an output element of the power distribution device 3. In the case where the motor-generator that takes the reaction force of engine torque rotates in a normal direction, the motor-generator is subjected to a regenerative control. On the other hand, in the case where the motor-generator that takes the reaction force of engine torque rotates in the reverse direction, the motor-generator is subjected to a power running control.

In the case where the motor-generator that takes the reaction torque is subjected to the regenerative control, the generated electric power may be charged into the electricity storage device, or may be supplied to the other motor-generator to perform the power running control of that motor-generator. On the other hand, in the case where the motor-generator that takes the reaction torque is subjected to the power running control, it is possible that electric power of the electricity storage device may be supplied to the motor-generator taking the reaction force, or that the other motor-generator may be regeneratively controlled and the generated electric power may be supplied to the motor-generator taking the reaction force. Then, in the power distribution device 3, if the rotation speed of the motor-generator that takes the reaction force of engine torque is controlled, the ratio between the engine rotation speed and the rotation speed of the output element can be steplessly (continuously) controlled due to the differential operation of the sun gear 4, the ring gear 5 and the carrier 7. That is, the power distribution device 3 acts as a stepless transmission.

Next, the control of the transmission 19 will be described. A forward travel position and a backward travel position that are selectable as control modes of the transmission 19 will be described. The forward travel position is a position that is used to generate driving power in such a direction as to move the vehicle 1 forward. In the forward travel position, switching can be selectively performed among a shift control mode 1 (1st), a shift control mode 2 (2nd), a shift control mode 3 (3rd), and a shift control mode 4 (4th). The shift control mode 1 and the shift control mode 3 are shift control modes each of which is selected when engine torque is to be transmitted from the ring gear 5 to the input shaft 17. In the case where the shift control mode 1 or the shift control mode 3 is selected, the reaction torque is taken by the motor-generator MG1. Concrete description thereof will be given. In the case where the shift control mode 1 is selected, the first clutch mechanism S1 is engaged to link the counter shaft 18 and the first-speed driven gear 26 and cut off the power transmission between the counter shaft 18 and the third-speed driven gear 28. Besides, the second clutch mechanism S2 is released to cut off both the power transmission of the second-speed driven gear 31 and the power transmission of the fourth-speed driven gear 32 with respect to the counter shaft 18. Thus, in the case where the shift control mode 1 is selected as a control mode of the transmission 19, the torque output from the ring gear 5 of the power distribution device 3 is transmitted to the counter shaft 18 via the first-speed gear pair 20.

In the case where the shift control mode 3 is selected, the first clutch mechanism S1 is engaged to link the counter shaft 18 and the third-speed driven gear 28 and cut off the power transmission between the counter shaft 18 and the first-speed driven gear 26. Besides, the second clutch mechanism S2 is released to cut off both the power transmission of the second-speed driven gear 31 and the power transmission of the fourth-speed driven gear 32 with respect to the counter shaft 18. Thus, in the case where the shift control mode 3 is selected as a control mode of the transmission 19, the torque output from the ring gear 5 of the power distribution device 3 is transmitted to the counter shaft 18 via third-speed gear pair 22.

The shift control mode 2 and the shift control mode 4 will be described. The shift control mode 2 and the shift control mode 4 are modes that are selected when the engine torque is to be transmitted from the sun gear 4 to the input shaft 9. In the case where the shift control mode 2 or the shift control mode 4 is selected, the reaction torque is taken by the motor-generator MG2. Concrete description thereof will be given. In the case where the shift control mode 2 is selected, the second clutch mechanism S2 is engaged to link the counter shaft 18 and the second-speed driven gear 31 and cut off the power transmission between the counter shaft 18 and the fourth-speed driven gear 32. Besides, the first clutch mechanism S1 is released to cut off both the power transmission of the first-speed driven gear 26 and the power transmission of the third-speed driven gear 28 with respect to the counter shaft 18. Thus, in the case where the shift control mode 2 is selected as a control mode of the transmission 19, the torque output from the sun gear 4 of the power distribution device 3 is transmitted to the counter shaft 18 via the second-speed gear pair 21.

On the other hand, in the case where the shift control mode 4 is selected, the second clutch mechanism S2 is engaged to link the counter shaft 18 and the fourth-speed driven gear 32 and cut off the power transmission between the counter shaft 18 and the second-speed driven gear 31. Besides, the first clutch mechanism S1 is released to cut off both the power transmission of the first-speed driven gear 26 and the power transmission of the third-speed driven gear 28 with respect to the counter shaft 18. Thus, in the case where the shift control mode 4 is selected as a control mode of the transmission 19, the torque output from the sun gear 4 of the power distribution device 3 is transmitted to the counter shaft 18 via the fourth-speed gear pair 23. Incidentally, at any of the foregoing forward travel positions, the backward-travel clutch mechanism SR is released to cut off the power transmission between the backward-travel intermediate gear 36 and the backward-travel intermediate shaft 34. Thus, in the transmission 19, by selectively switching among the plurality of shift control modes, the speed change ratio, that is, the ratio between the rotation speed of the input shaft 9 or the input shaft 17 and the rotation speed of the counter shaft 18, can be altered stepwise.

On the other hand, the backward travel position is a position that is used to generate driving power in such a direction as to back the vehicle 1. In the case where the backward travel position is selected, the backward-travel clutch mechanism SR is engaged to link the backward-travel intermediate gear 36 and the backward-travel intermediate shaft 34. In addition, in the case where the backward travel position is selected, the first clutch mechanism S1 and the second clutch mechanism S2 are released to cut off all the power transmissions of the first-speed driven gear 26, the second-speed driven gear 31, the third-speed driven gear 28 and the fourth-speed driven gear 32 with respect to the counter shaft 18. Furthermore, in the case where the backward travel position is selected, the motor-generator MG2 is rotated in the normal direction and is subjected to the power running control, and the torque thereof is transmitted to the final pinion gears 37 of the counter shaft 18 via the backward-travel gear train 33.

Incidentally, the rotation direction of the counter shaft 18 in the case where the backward travel position is selected is opposite to the rotating direction thereof in the case where the forward travel position is selected. FIG. 2 shows actions of the first clutch mechanism S1, the second clutch mechanism S2 and the backward-travel clutch mechanism SR in various shift control modes. In FIG. 2, "x" shows release of the clutch mechanism, and "○" shows engagement of the clutch mechanism. In the above-described manner, torque is transmitted to the counter shaft 18, and then the torque is transmitted to the wheels via the drive shaft, thus generating driving power. In the vehicle shown in FIG. 1, the "speed change ratio of the driving apparatus (power train)" expressed as the ratio between the engine rotation speed and the rotation speed of the counter shaft 18 can be controlled by executing the control of the speed change ratio of the power distribution device 3 and the control of the speed change ratio of the transmission 19.

Next, a plurality of drive modes used to control the "speed change ratio of the driving apparatus", and the switching among these drive modes will be described. Firstly, each of the drive modes uses a different shift control mode. In this embodiment, drive modes 1 to 4 can be selectively used. Concretely, when the drive mode 1 is selected, the shift control mode 1 is used; when the drive mode 2 is selected, the shift control mode 2 is used; when the drive mode 3 is selected, the shift control mode 3 is used; and when the drive mode 4 is selected, the shift control mode 4 is used. Then, as manners of switching among the drive modes 1 to 4, a first drive mode switching manner and a second drive mode switching manner are used.

Hereinafter, the technical meanings of the first drive mode switching manner and the second drive mode switching manner will be described with reference to the flowchart of FIG. 3. Firstly, a signal input to the electronic control device is processed to determine a target driving power, a target engine output, etc. (step S1). For example, the target request driving power is determined on the basis of the vehicle speed and the degree of accelerator operation (acceleration request), and the target engine output to be borne by the engine is determined on the basis of the target request driving power. When the target request driving power is high, the target engine output is a high output. When the target request driving power is low, the target engine output is a low output. Concretely, a target engine rotation speed and a target engine torque in accordance with an optimal fuel economy curve are determined such that the fuel economy of the engine reaches an optimal fuel economy level. By controlling the speed change ratio of the power distribution device 3, the actual engine rotation speed can be brought closer to the target engine rotation speed. Furthermore, by controlling the degree of opening of the electronic throttle valve or the like, the actual engine torque can be brought closer to the target engine torque. In addition, the data needed for performing the processing of step S1 is arranged in the form of a map and stored in the electronic control device 54 beforehand.

Subsequently to step S1, it is judged whether or not the target engine output is high output (step S2). If an affirmative judgment is made at step S2, the first drive mode switching manner is selected (step S3), and then this control routine is ended. On the other hand, if a negative judgment is made at step S2, the second drive mode switching manner is selected (step S4), and then this control routine is ended. The first drive mode switching manner is a manner in which if the vehicle speed is constant, it is possible to perform the selective switching among the plurality of drive modes while keeping the engine rotation speed constant (without chaining it). A concrete example of the case where the switching among the plurality of drive modes is performed in the first drive mode switching manner will be described with reference to the alignment chart of FIG. 4. In the alignment chart of FIG. 4, the horizontal axis shows a positional relationship among rotating elements in the power distribution device 3, and a positional relationship among rotating elements in the transmission 19, and the vertical axis shows the rotation speed and the rotation direction of each rotating element. In the power distribution device 3, the engine 2 is positioned between the motor-generator MG1 and the motor-generator MG2. In the transmission 19, the first-speed driving gear 25 and the second-speed driving gear 29 are disposed at substantially the same position, and third-speed driving gear 27 and the fourth-speed driving gear 30 are disposed between the first-speed driving gear 25/second-speed driving gear 29 and the counter shaft 18.

Figure 4:
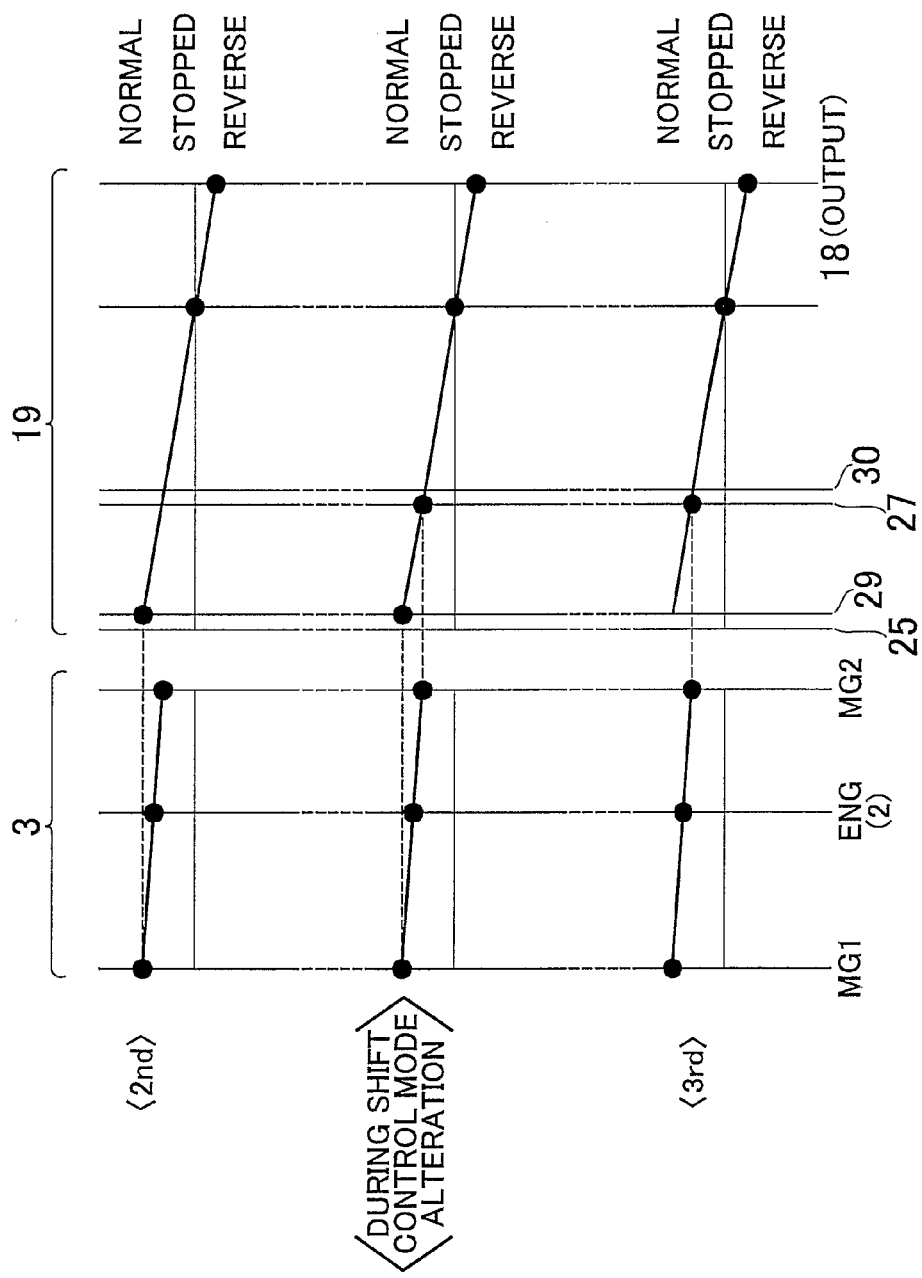
FIG. 4 is an alignment chart corresponding to processes executed in the example of the control shown in FIG. 3.

The alignment chart in FIG. 4 shows a process of alteration from the drive mode 2 that uses the shift control mode 2 to the drive mode 3 that uses the shift control mode 3. Firstly, in the case where the shift control mode 2 is selected, the second clutch mechanism S2 is engaged as shown in an upper portion in FIG. 4. Besides, the engine 2, the motor-generator MG1 and the motor-generator MG2 all rotate in the normal rotation direction, and the counter shaft 18 rotates in the reverse rotation direction. It is to be noted herein that the normal rotation direction is the rotation direction of the engine 2, and the reverse rotation direction is the direction opposite to the rotation direction of the engine 2. In the case where the mode is to be altered from the shift control mode 2 to the shift control mode 3, the first clutch mechanism S1 is engaged to link the third-speed driven gear 28 and the counter shaft 18 while the second clutch mechanism S2 is kept engaged as shown in an intermediate portion in FIG. 4.

In the case where the third-speed driven gear 28 and the counter shaft 18 are linked as mentioned above the engine rotation speed will not change in the process of linking the third-speed driven gear 28 and the counter shaft 18 provided that the rotation speed of the third-speed driven gear 28 and the rotation speed of the counter shaft 18 are equal (synchronized) beforehand. Then, as shown in a lower portion in FIG. 4, the second clutch mechanism S2 is released. In addition, in the first drive mode switching manner, it is also possible to perform the alteration from the drive mode 3 to the drive mode 2, the alteration from the drive mode 1 to the drive mode 2, the alteration from the drive mode 2 to the drive mode 1, the alteration from the drive mode 3 to the drive mode 4, the alteration from the drive mode 4 to the drive mode 3.

Figure 5:
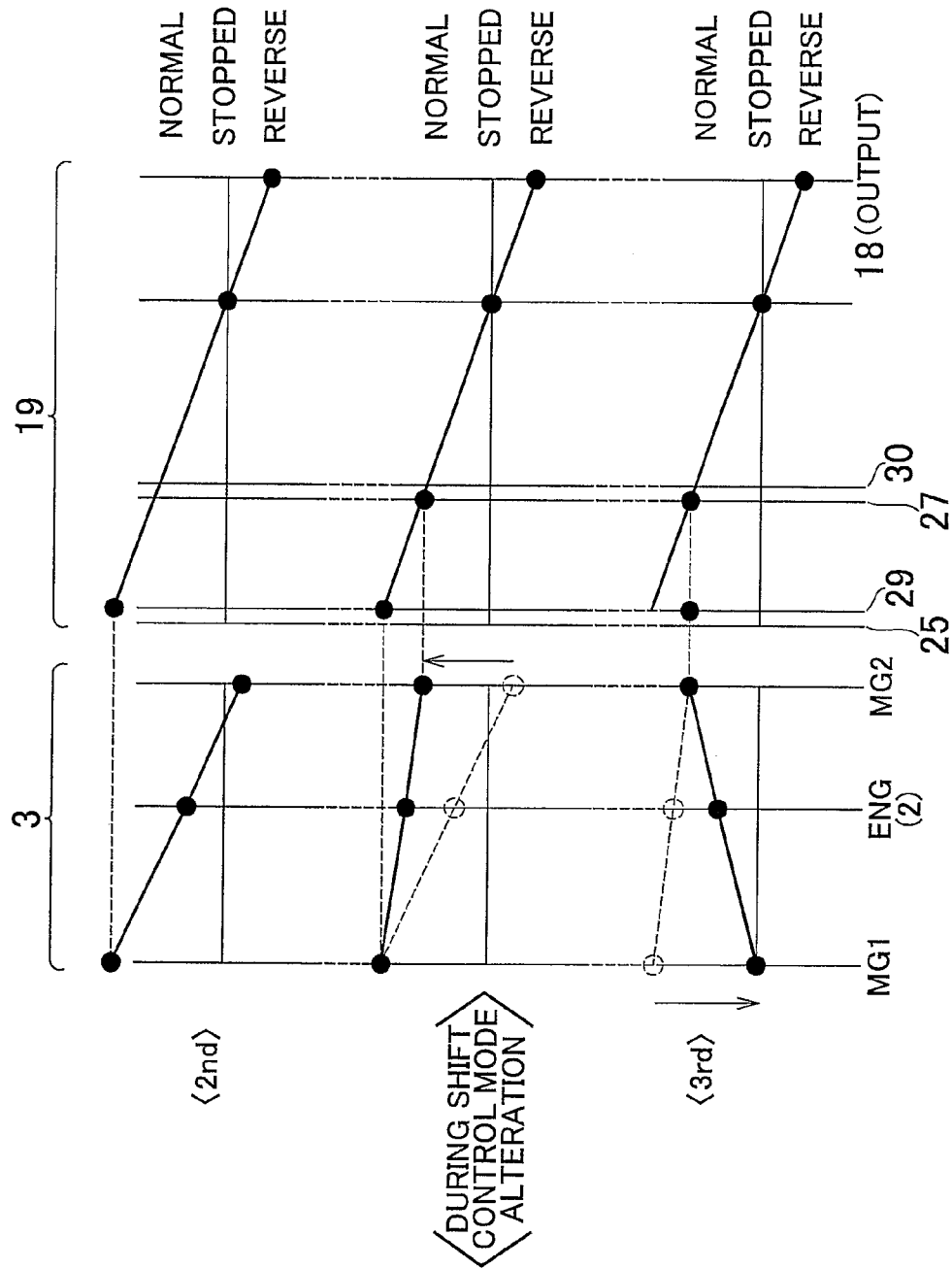
FIG. 5 is an alignment chart corresponding to processes executed in the example of the control shown in FIG. 3.

Next, the second drive mode switching manner will be described. This is a manner in which when the vehicle speed is constant, alteration from one of the plurality of drive modes to another is performed while the engine rotation speed is being changed. A concrete example of the switching of drive modes in the second drive mode switching manner will be described with reference to the alignment chart of FIG. 5. The alignment chart in FIG. 5 shows a process of alteration from the drive mode 2 that uses the shift control mode 2 to the drive mode 3 that uses the shift control mode 3. Firstly, in the case where the shift control mode 2 is selected, the second clutch mechanism S2 is engaged, and the engine 2 and the motor-generator MG1 both rotate in the normal rotation direction, and the counter shaft 18 rotates in the reverse rotation direction as shown in an upper portion in FIG. 5.

in the case where the mode is to be altered from the drive mode 2 to the drive mode 3, the first clutch mechanism S1 is engaged while the second clutch mechanism S2 is kept engaged as shown in an intermediate portion of FIG. 5. Thus, at a stage prior to the linkage of the third-speed driven gear 28 and the counter shaft 18, the third-speed driven gear 28 rotates in the reverse rotation direction and the counter shaft 18 rotates in the normal rotation direction as shown by a broken line in the intermediate portion of FIG. 5. Then, as shown by a solid line in the intermediate portion of FIG. 5, the motor-generator MG2 is controlled to rotate the third-speed driven gear 28 in the normal rotation direction, and a control of equalizing the rotation speed of the third-speed driven gear 28 and the rotation speed of the counter shaft 18 is executed. During execution of the foregoing control, the vehicle speed is constants and therefore the engine rotation speed rises as shown by a solid line in the intermediate portion of FIG. 5.

After that, as shown in a lower portion of FIG. 5, the second clutch mechanism S2 is released, and the rotation speed of the motor-generator MG1 is declined to return the engine rotation speed to the engine rotation speed shown in the upper portion of FIG. 5. In addition, in the second drive mode switching manner, it is also possible to perform the alteration from the drive mode 3 to the drive mode 2, the alternation from the drive mode 1 to the drive mode 2, the alteration from the drive mode 2 to the drive mode 1, the alteration from the drive mode 3 to the drive mode 4, and the alteration from the drive mode 4 to the drive mode 3.

Figure 6:
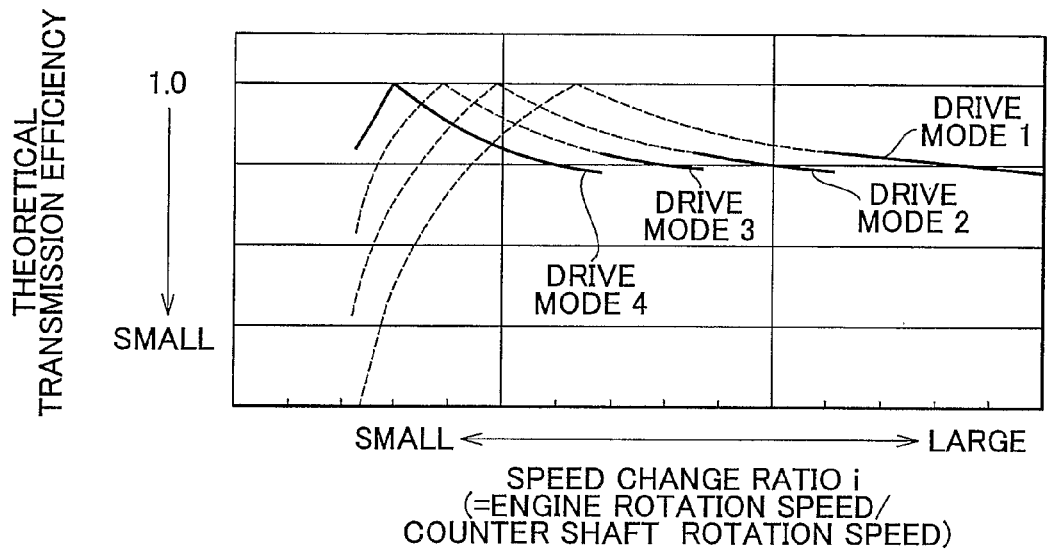
FIG. 6 is a graph showing a relationship between the theoretical transmission efficiency of power and the speed change ratio of the entire hybrid driving apparatus as a whole in the hybrid driving apparatus shown in FIG. 1.
Figure 7:
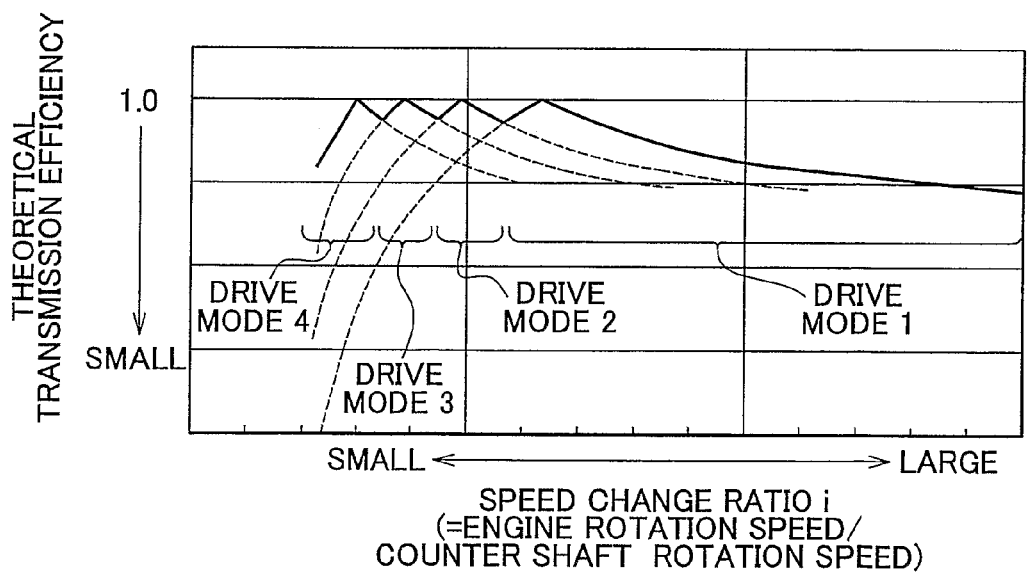
FIG. 7 is a graph showing a relationship between the theoretical transmission efficiency of power and the speed change ratio of the hybrid driving apparatus as a whole in the hybrid driving apparatus shown in FIG. 1.

Next, differences between the first drive mode switching manner and the second drive mode switching manner will be described with reference to FIGS. 6 and 7. FIG. 6 is a characteristic graph showing the first drive mode switching manner, and FIG. 7 is a characteristic graph showing the second drive mode switching manner. In FIGS. 6 and 7, the horizontal axis shows the speed change ratio (i), which is the ratio between the engine rotation speed and the rotation speed of the counter shaft 18, and the vertical axis shows the theoretical transmission efficiency. The theoretical transmission efficiency is the proportion of the power of the engine 2 that is transmitted to the counter shaft 18. The theoretical transmission efficiency presupposes that electric power is not given or received between the electric power supply device 53 and the motor-generator MG1 or MG2.

The theoretical transmission efficiency is assumed to be 1.0 in the case where the motor-generator MG1 is stopped. The theoretical transmission efficiency being less than 1.0 means that the amount of passage of electricity in the electric power supply device 53 is increased due to conversion of power of the engine 2 into electric energy or conversion of electric energy into power of a motor-generator, that is, means that the dependency on electricity of the vehicle 1 as a whole becomes larger (higher). Besides, in FIGS. 6 and 7, the drive modes 1 to 4 are shown by characteristic curves. The characteristic curves corresponding to the individual drive modes have an upwardly convex mountain-shaped characteristic. The mechanical power transmission efficiencies of at the peaks of the characteristic curves corresponding to the individual drive modes are all 1.0. In the case where the power running control or the regenerative control is executed on the motor-generator MG1 or MG2, conversion between mechanical energy and electric energy is performed, and therefore the theoretical transmission efficiency is less than 1.0.

With respect to the peak of each drive mode-showing characteristic curve, the left side region is a region where the motor-generator MG1 rotates in the reverse rotation direction and is subjected to the power running control, and the right side region is a region where the motor-generator MG1 rotates in the normal rotation direction and is subjected to the regenerative control. As shown in FIGS. 6 and 7, the control range of the speed change ratio (i) is different for each drive mode. Concretely, the control range of the speed change ratio (i) in the drive mode 2 is a region of the speed change ratio that is smaller than the control range of the speed change ratio (i) in the drive mode 1. Besides, the control range of the speed change ratio (i) in the drive mode 3 is a region of the speed change ratio that is smaller than the control range of the speed change ratio (i) corresponding to the drive mode 2. Furthermore, the control range of the speed change ratio (i) in the drive mode 4 is a region of the speed change ratio that is smaller than the control range of the speed change ratio (i) corresponding to the drive mode 3.

As described above, the transmission 19 is provided in the power transmission path that extends from the motor-generators MG1 and MG2 to the counter shaft 18. This transmission 19 controls the ratios between the rotation speeds of the motor-generators MG1, MG2 and the rotation speed of the counter shaft 1. Therefore, by selectively switching among the drive modes 1 to 4, the range of selection of the speed change ratio (i) of the driving apparatus can be expanded and, at the same time, the amount of mechanical power transmission can be increased and the amount of passage of electric power can be reduced. Thus, the power transmission efficiency of the entire driving apparatus improves. Therefore, the required torques of the motor-generators MG1, MG2 can be reduced, and the build of the motor-generators MG1, MG2 can be reduced in size.

In either the first drive mode switching manner or the second drive mode switching manner, during the process of altering the drive mode, the first clutch mechanism St and the second clutch mechanism S2 are both engaged. Therefore, during the drive mode altering process, decline of the torque transmitted to the wheels 51 can be restrained. Therefore, the state of low driving power can be avoided, and alteration of the drive mode can be smoothly performed. Besides, if the process proceeds to step S3, the engine rotation speed does not change at the time of altering the drive mode. Therefore, when the speed change ratio of the driving apparatus is to be altered, smooth shift feeling can be obtained. Furthermore, in the second drive mode switching manner, the theoretical transmission efficiency can be kept high as shown in FIG. 7 regardless of which drive mode is selected. Besides, when the target engine output is low, the engine rotation speed is also low. Therefore, even if the engine rotation speed rises in the process of altering the drive mode, the engine rotation speed changes only in a small width, and the engine rotation speed does not excessively rise, and discomfort is not given to the driver.

In the power train in FIG. 1, the engine 2, the motor-generator MG2 and the input shafts 9, 17 are coaxially disposed, and the input shafts 9, 17 and the counter shaft 18 are disposed in parallel. Furthermore the rotation shaft 13 of the motor-generator M11 is disposed in parallel with the input shaft 9, and the region where the transmission 19 is disposed and the region where the motor-generator MG1 is disposed overlap in the direction of the rotation axis. Due to these constructions, the space for arrangement of component parts in the direction of the rotation axis can be shortened, and the entire length can be reduced thus improving the vehicle mountability. Furthermore since the input shafts 9, 17 and the rotation shaft 13 of the motor-generator MG1 are disposed in parallel, the entire length can be further shortened. Furthermore, since the motor-generator MG2 is disposed annularly so as to surround the outside of the power distribution device 3, the space for disposing component parts in the direction of the rotation axis can be made further compact.

Furthermore, since the motor-generator MG2 is provided annularly so as to surround the outside of the power distribution device 3, the radius of the rotor 16 is large so that the torque transmitted to the input shaft 17 can easily be made high. Still further, since the transmission 19 has a parallel-axes type structure, the interaxial distance between the input shafts 9, 17 and the counter shaft 18 can be made short. Therefore, even through the rotation shaft 13 of the motor-generator M11 is disposed in parallel with the input shafts 9, 17, the vehicle mountability of the entire driving apparatus does not deteriorate. Besides, since the driven gears 26, 28, 31, 32 are attached to one shaft, that is, the counter shaft 18, size increase of the build of the apparatus in the radial directions about the rotation axis can be restrained. This contributes to a further compact construction of the driving apparatus, and improves the vehicle mountability. Furthermore, if dog clutches, that is, meshing clutches, are used as the first clutch mechanism S1, the second clutch mechanism S2 and the backward-travel clutch mechanism SR, the slip loss as in friction clutches is eliminated, and a compact construction and a reduced cost can be achieved.

Embodiment 2

Figure 8:
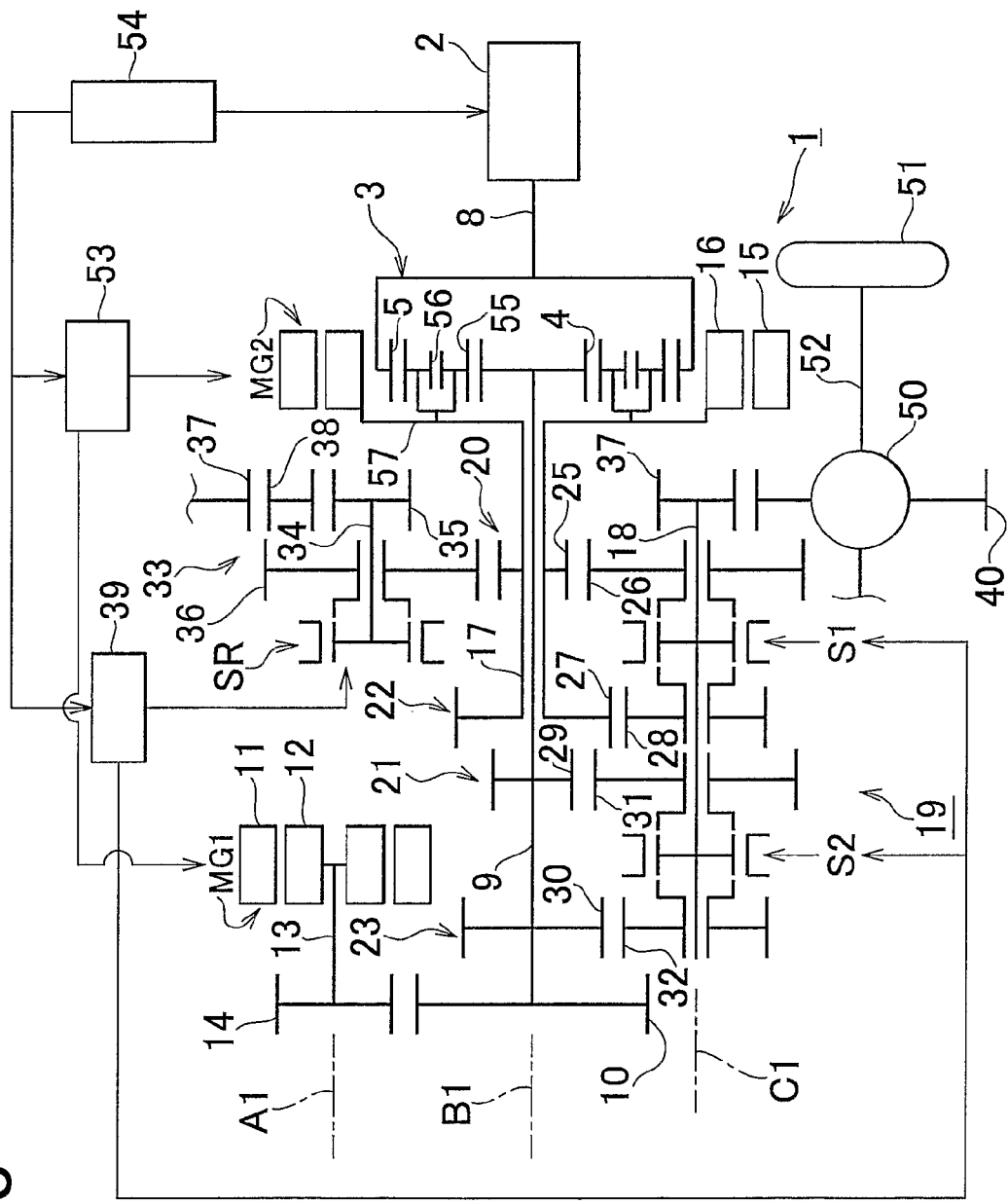
FIG. 8 is a conceptual diagram showing another construction example of the power train and the control system of a vehicle that has a hybrid driving apparatus in an embodiment of the invention.

Next, another example of the construction of the power distribution device 3 will be described with reference to FIG. 8. The power distribution device 3 shown in FIG. 8 is made up of a double-pinion planetary gear mechanism. Specifically, the power distribution device 3 has a sun gear 4 and a ring gear 5 that are coaxially disposed, pinion gears 55 meshed with the sun gear 4, pinion gears 56 meshed with the pinion gears 55 and with the ring gear 5, and a carrier 57 that supports the pinion gears 55, 56 so that they are rotatable about their own axes and are integrally revolvable. Then, the engine 2 is power-transmittably linked to the ring gear 5, and the carrier 57 is linked to a rotor 16 of the motor-generator MG2 and to the input shaft 17, and the sun gear 4 is linked to the input shaft 9. In FIG. 8, too, the motor-generator MG2 is disposed annually so as to surround the outside of the power distribution device 3. Other constructions shown in FIG. 8 are substantially the same as those shown in FIG. 1.

In the power distribution device 3 in FIG. 8, engine torque is input to the ring gear 5, and reaction torque can be taken by either the motor-generator MG1 or the motor-generator MG2. Specifically, in the case where the ring gear 5 serves as an input element and the sun gear 4 and the motor-generator MG1 serve as reaction force elements, the carrier 57 serves as an output element. The torque output from the carrier 57 is transmitted to the input shaft 17. On the other hand, in the case where the ring gear 5 serves as an input element and the motor-generator M62 and the carrier 57 serve as reaction force elements, the sun gear 4 serves as an output element. The torque output from the sun gear 4 is transmitted to the input shaft 9.

Figure 3:
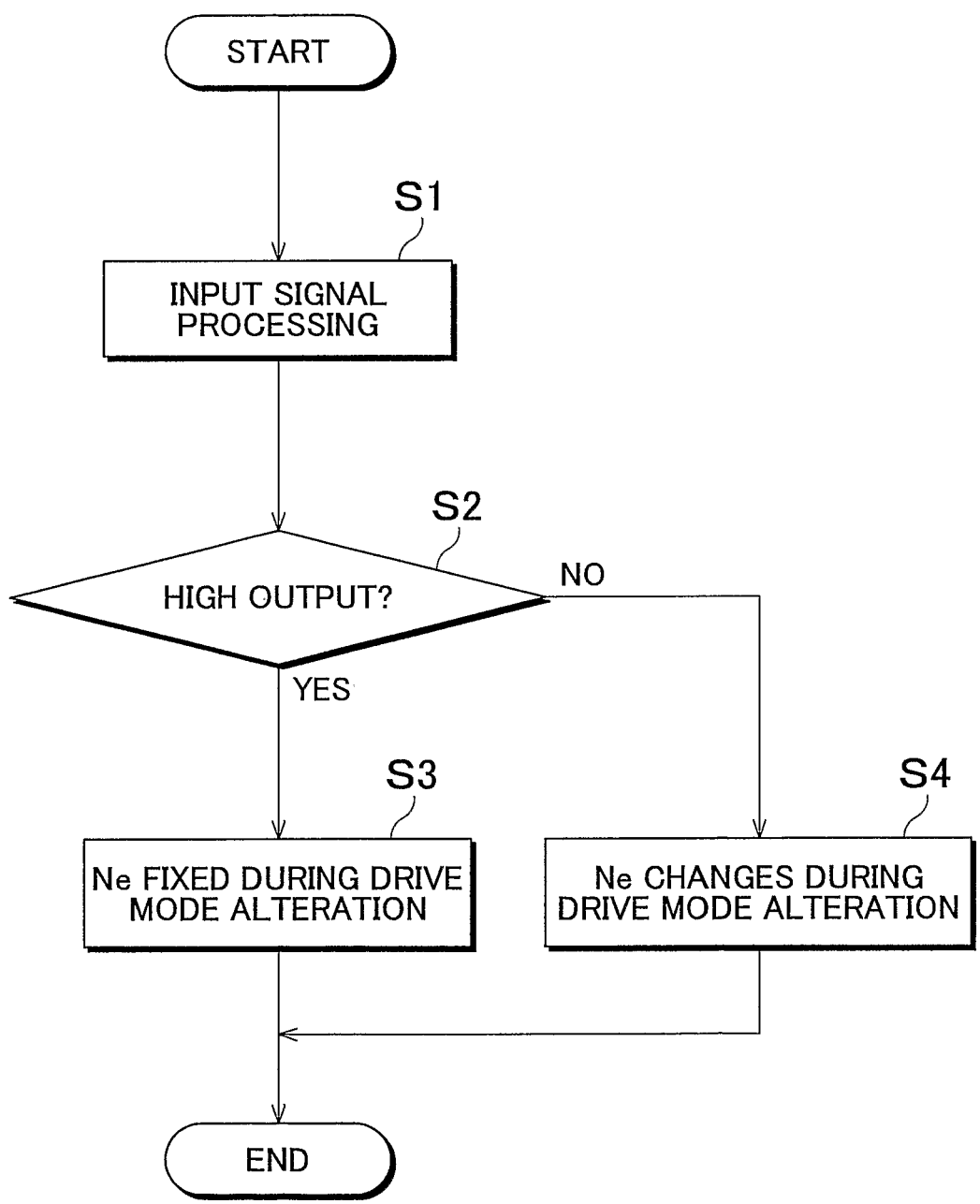
FIG. 3 is a flowchart showing an embodiment of a control that can be executed by the hybrid vehicle driving apparatus of the invention.

In the power train shown in FIG. 3, the switching of the shift control mode can be executed in the same fashion as in the power train shown in FIG. 1. Specifically, in the case where the forward travel position is selected and the shift control mode 1 or the shift control mode 3 is selected, a control in which the reaction force of engine torque is taken by the motor-generator MG1 is executed. In the case where the forward travel position is selected and the shift control mode 2 or the shift control mode 4 is selected, a control in which the reaction force of engine torque is taken by the motor-generator MG2 is executed. In addition, in the case where the backward travel position is selected, a control in which the reaction force of engine torque is taken by the motor-generator MG1 is executed. Furthermore, in the case where either the forward travel position or the backward travel position is selected, the engagement/release controls of the first and second clutch mechanisms S1, S2 and the backward-travel clutch mechanism SR in the individual shift control modes are the same as in the power train shown in FIG. 1. In the case where the power distribution device 3 shown in FIG. 8 is used, the positional relationships among the rotating elements linked to the power distribution device 3 in the alignment charts shown in FIGS. 4 and 5 are the same as in the power distribution device 3 shown in FIG. 1. Then, in the power train in FIG. 8, too, the example of the control shown in FIG. 3 can be executed, and will provide substantially the same effects as the power train shown in FIG. 1.

The correspondence relationship between the construction shown FIG. 1 and the construction of the invention will be described. The carrier 7 can be regarded as a first rotating element in the invention, and the sun gear 4 can be regarded as a second rotating element in the invention, and the ring gear 5 can be regarded as a third rotating element in the invention, and the power distribution device 3 can be regarded as a gear mechanism and a single-pinion planetary gear mechanism in the invention. The engine 2 can be regarded as a first driving power source in the invention, and the motor-generator MG1 can be regarded as a second driving power source in the invention, and the motor-generator MG2 can be regarded as a third driving power source in the invention. The counter shaft 18 can be regarded as a driven member in the invention, and the input shaft 9 can be regarded as a first power transmission path in the invention, and the input shaft 17 can be regarded as a second power transmission path in the invention. The transmission 19 can be regarded as a transmission in the invention. The transmission 19 is equipped with transmissions that are provided respectively on the first power transmission path and the second power transmission path.

Furthermore, the input shaft 9 can be regarded as a first intermediate rotating member in the invention, and the input shaft 17 can be regarded as a second intermediate rotating member in the invention, and the rotation axis B1 can be regarded as a "rotation axis of the first intermediate rotating member and the second intermediate rotating member" in the invention, and the rotation axis C1 can be regarded as a "rotation axis of the driven member" in the invention. The gear transmission devices, such as the first to fourth-speed gear pairs 20 to 23, can be regarded as transmission devices in the invention. Furthermore, the correspondence relationship between the construction shown in FIG. 8 and the construction of the invention will be described. The power distribution device 3 can be regarded as a gear mechanism and a double-pinion planetary gear mechanism in the invention, and the ring gear 5 can be regarded as a first rotating element in the invention, and the sun gear 4 can be regarded as a second rotating element in the invention, and the carrier 57 can be regarded as a third rotating element in the invention, and the pinion gears 55 can be regarded as first pinion gears in the invention, and the pinion gears 56 can be regarded as second pinion gears in the invention. The correspondence relationship between the other construction shown in FIG. 8 and the construction of the invention is the same as the correspondence relationship between the construction shown in FIG. 1 and the construction of the invention.

Furthermore, the correspondence relationship between the functional means shown in FIG. 3 and the construction of the invention will be described. Step S3 can be regarded as a first mode switching manner, and step S4 can be regarded as a second mode switching manner, and steps 1 to 4 can be regarded as a mode switching manner selection means in the invention. Besides, the speed change ratio (i) described with reference to FIGS. 6 and 7 can be regarded as a "speed change ratio between the rotation speed of the first driving power source and the rotation speed of the driven member" in the invention, and the drive modes 1 to 4 can be regarded as a "plurality of drive modes" in the invention.

Embodiment 3

Figure 9:
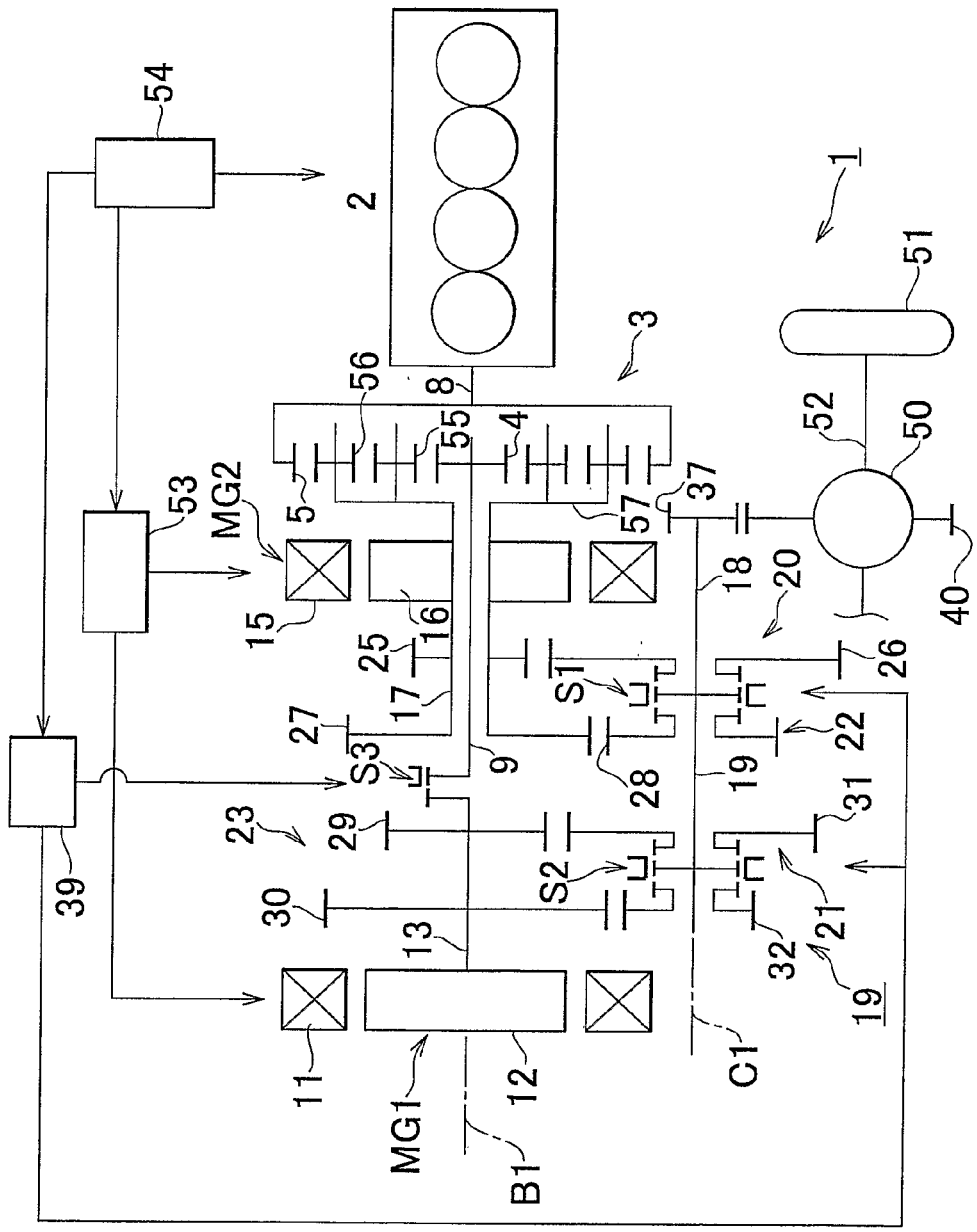
FIG. 9 is a conceptual diagram showing still another construction example of the power train and the control system of a vehicle that has a hybrid driving apparatus in an embodiment of the invention.

Next, Embodiment 3 of the invention will be described with reference to FIG. 9. In the construction of Embodiment 3, the same constructions as those of Embodiment 1 and Embodiment 2 are denoted by the same reference characters as in Embodiment 1 and Embodiment 2. A power distribution device 3 shown in FIG. 9 is made up of the same double-pinion planetary gear mechanism as in Embodiment 2. Besides, a transmission 19 shown in FIG. 9 is made up in the same fashion as the transmission 19 described in conjunction with Embodiment 1. Differences between the construction of Embodiment 3 and the constructions of Embodiment 1 and Embodiment 2 will be described. The motor-generator MG1 is disposed coaxially with the input shaft 9. That is, the rotation shaft 13 of the motor-generator MG1 rotates about the rotation axis B1. A second-speed driving gear 29 constituting the second-speed gear pair 21, and a fourth-speed driving gear 30 constituting the fourth-speed gear pair 23 are formed on the rotation shaft 13.

Besides, in Embodiment 3, a third clutch mechanism S3 is provided in addition to the first clutch mechanism S1 and the second clutch mechanism S2. The third clutch mechanism S3 is a mechanism that controls the transmission torque between the engine 2 and the transmission 19. Concretely, the third clutch mechanism S3 is able to power-transmittably link the input shaft 9 and the rotation shaft 13, and to cut off the power transmission between the input shaft 9 and the rotation shaft 13. In this embodiment, by controlling the motor-generator 1 or the motor-generator 2, the rotation speed of the input shaft 9 and the rotation speed of the output shaft 13 can be equalized to engage or release the third clutch mechanism S3. The third clutch mechanism S3 is constructed to be controlled by the actuator 39 as in the first clutch mechanism S1 and the second clutch mechanism S2. Furthermore, in Embodiment 3, a motor-generator MG2 is provided around an outer periphery of the input shaft 17. That is, the motor-generator MG2 and the power distribution device 3 are disposed at different positions in the direction of the rotation axis. Incidentally, in FIG. 9, the backward-travel gear train 33 described in conjunction with Embodiment 1 is omitted In Embodiment 3, component portions similar to those of Embodiment 1 and Embodiment 2 achieve operation and effects similar to those of Embodiment 1 and Embodiment 2. In Embodiment 3, by engaging the third clutch mechanism S3 and raising the transmission torque between the input shaft 9 and the output shaft 13, it is possible to execute the controls described in conjunction with Embodiment 1. In this case, the counter shaft 18 and the second-speed driven gear 31 may be linked to set the second speed, or the counter shaft 18 and the fourth-speed driven gear 32 may be linked to set the fourth speed. For example, the control of transmission 19 described in conjunction with Embodiment 1 can be executed. In Embodiment 3, too) the relationship between each shift control mode of the transmission 19 and the action of each clutch mechanism is the same as shown in FIG. 2. Besides, in Embodiment 3 too, the control shown in FIG. 3 can be executed. In this case, the alignment charts of FIGS. 4 and 5 are applicable. Furthermore, in Embodiment 3, too, the characteristics shown in the graphs shown in FIGS. 6 and 7 are applicable.

Figure 10:
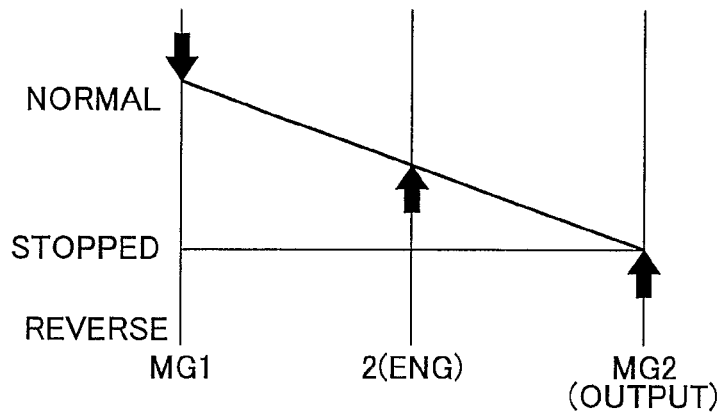
FIG. 10 is an example of an alignment chart in the embodiment shown in FIG. 9.

Next, a control of the transmission 19, a control of the engine 2 and a control of the motor-generators MG1, MG2 which can be executed in the case where the forward travel position is selected in Embodiment 3 will be described. Firstly, the control executed in the case where the shift control mode 1 is selected at the time of starting the vehicle 1 will be described with reference to the alignment chart of FIG. 10. In the case where the shift control mode 1 is selected, the first clutch mechanism S1 is engaged, and the second clutch mechanism S2 is released. Besides, as shown in FIG. 10, the engine 2 rotates in the normal rotation direction, and the motor-generator MG1 rotates in the normal rotation direction, and is subjected to the regenerative control to take the reaction force of engine torque. Besides, the motor-generator MG2 is stopped, and the motor-generator MG2 is subjected to the power running control and a torque in the normal rotation direction is generated. Specifically, the carrier 57 of the power distribution device 3 serves as an output element.

Figure 11:
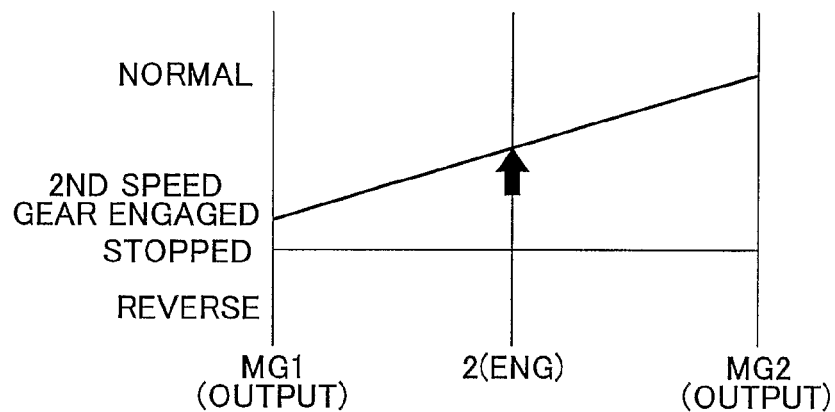
FIG. 11 is an example of an alignment chart in the embodiment shown in FIG. 9.
Figure 12:
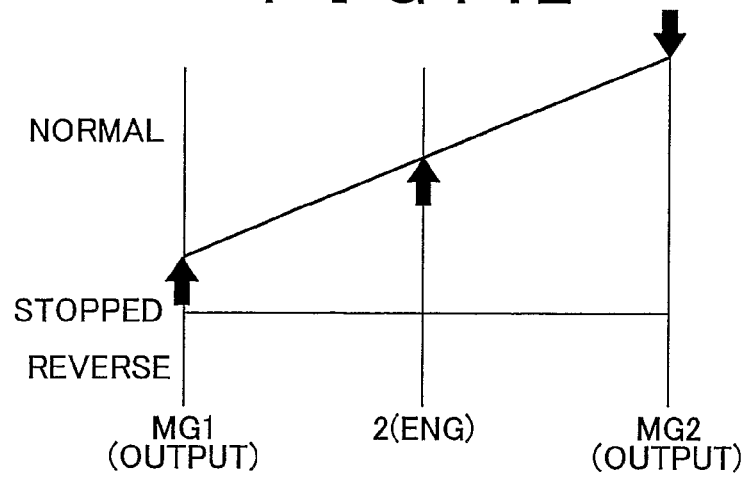
FIG. 12 is an example of an alignment chart in the embodiment shown in FIG. 9.

After that, the vehicle speed rises, and the rotation speed of the motor-generator MG1 declines. When the rotation speed of the motor-generator MG1 becomes equal to the rotation speed that is in accordance with the then-occurring vehicle speed and the speed change ratio of the second-speed gear pair 21, it is possible to alter from the shift control mode 1 to the shift control mode 2. Thus, in the case of alteration from the shift control mode 1 to the shift control mode 2, the first clutch mechanism S1 and the second clutch mechanism S2 are both engaged, and the motor-generators MG1, MG2 are both idled as shown in the alignment chart of FIG. 11. That is, each motor-generator MG1, MG2 assumes a no-load state where neither power running nor regeneration is performed. Then, the first clutch mechanism S1 is released, and the second clutch mechanism S2 is kept in the engaged state, thus establishing the shift control mode 2. In the case where the shift control mode 2 is established, the motor-generator MG2 rotates in the normal rotation direction, and is subjected to the regenerative control to take the reaction force of engine torque, and the sun gear 4 of the power distribution device 3 serves as an output element. Besides, the motor-generator MG1 is subjected to the power running control.

Figure 13:
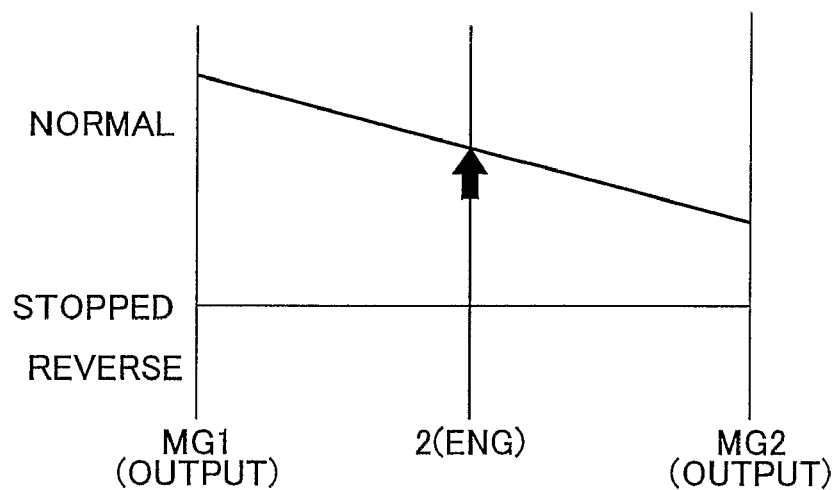
FIG. 13 is an example of an alignment chart in the embodiment shown in FIG. 9.

When, as the vehicle speed further rises following the selection of the shift control mode 2, the rotation speed of the motor-generator MG2 becomes equal to the rotation speed that is in accordance with the then-occurring vehicle speed and the speed change ratio of the third-speed gear pair 22, the first clutch mechanism S1 is engaged. Specifically, the first clutch mechanism S1 and the second clutch mechanism S2 are both engaged. Furthermore, the motor-generators MG1, MG2 are both idled as shown in the alignment chart of FIG. 13. Then, the second clutch mechanism S2 is released, and the first clutch mechanism S1 is kept in the engaged state, thus establishing the shift control mode 3. In the case where the shift control mode 3 is established, the motor-generator MG1 rotates in the normal rotation direction, and is subjected to the regenerative control to take the reaction force of engine torque, and the carrier 57 of the power distribution device 3 serves as an output element. Furthermore, the motor-generator MG2 is subjected to the power running control.

When, as the vehicle speed further rises following the selection of the shift control mode 3, the rotation speed of the motor-generator MG1 becomes equal to the rotation speed that is in accordance with the then-occurring vehicle speed and the speed change ratio of the fourth-speed gear pair 23, the second clutch mechanism S2 is engaged. Specifically, the first clutch mechanism S1 and the second clutch mechanism S2 are both engaged. Furthermore, the motor-generators MG1, MG2 are both idled. Then, the first clutch mechanism S1 is released, and the second clutch mechanism S2 is kept in the engaged state, thus establishing the shift control mode 4. In the case where the shift control mode 4 is established, the motor-generator MG2 is subjected to the regenerative control to take the reaction force of engine torque, and the Sun gear 4 of the power distribution device 3 serves as an output element. Furthermore, the motor-generator MG1 is subjected to the power running control. Incidentally, in Embodiment 3, too, it is possible to execute the control of altering from the shift control mode 4 to the shift control mode 3, the control of altering the shift control mode 3 to the shift control mode 2, and the control of altering shift control mode 2 to the shift control mode 1.

Figure 14:
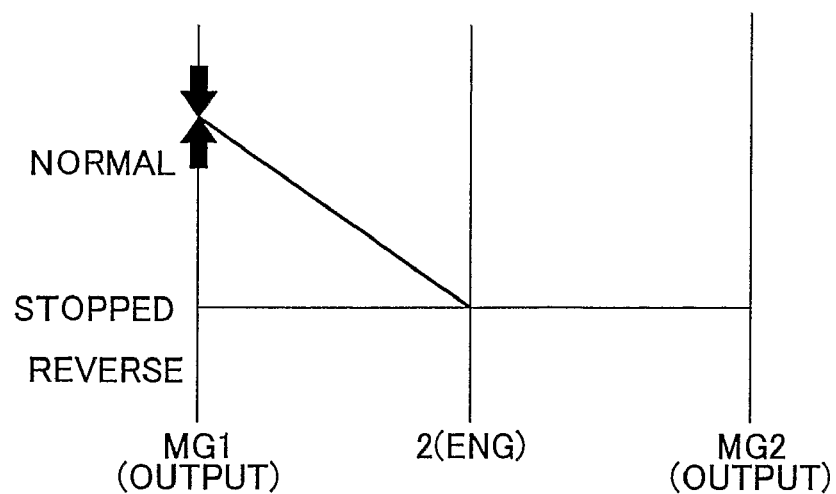
FIG. 14 is an example of an alignment chart in the embodiment shown in FIG. 9.

Next, an EV run mode (electric motor vehicle mode) in which the vehicle 1 runs by subjecting a motor-generator to the power running control and without transmission of engine torque to the wheels 51 in Embodiment 3 will be described. In the where the EV run mode is selected, the third clutch mechanism S3 is released. Then, for example, the second clutch mechanism S2 can be engaged to link the output shaft 13 and the counter shaft 18, and the motor-generator MG1 can be subjected to the power running control to generate torque in the normal rotation direction as shown in FIG. 14. At this time, the first clutch mechanism S1 has been released, and the motor-generator MG2 and the engine 2 have both been stopped. In addition, in the case where the vehicle 1 coasts during a run based on the torque of the first motor-generator MG1, the regenerative control is executed on the motor-generator MG1.

Another EV run mode in which the vehicle 1 runs by subjecting the motor-generator MG2 to the power running control and without transmission of engine torque to the wheels 51 in Embodiment 3 will be described. In this case, the third clutch mechanism S3 is released. Then, the first clutch mechanism S1 can be engaged to link the input shaft 17 and the counter shaft 18, and the motor-generator MG2 can be subjected to the power running control to generate torque in the normal rotation direction. At this time, the second clutch mechanism S2 has been released, and the motor-generator MG1 and the engine 2 have both been stopped. In addition, in the case where the vehicle 1 coasts during a run based on the torque of the second motor-generator MG2, the regenerative control is executed on the motor-generator MG2.

Next, the case of switching between the control of transmitting torque of the motor-generator MG1 to the wheels 51 and the control of transmitting torque of the motor-generator MG2 to the wheels 51 will be described. In this case, the motor-generator that has been stopped is subjected to the power running control, and the rotation speed of the motor-generator is made equal to the rotation speed that is in accordance with the then-occurring vehicle speed and the speed change ratio established by the engagement of a clutch mechanism, and the clutch mechanism is engaged and the clutch mechanism that has been engaged is released. Thus, both the shifting between the first speed and the second speed and the shifting between the third speed and the fourth speed can be performed with the engine 2 remaining stopped since the third clutch mechanism S3 has been released in either case of shifting.

Furthermore, a control of transmitting torques of the two motor-generators MG1, MG2 to the wheels 51 will be described. In this case, the first clutch S1 and the second clutch S2 are both engaged, and the third clutch mechanism S3 is released. Then, the motor-generators MG1, MG2 are both subjected to the power running control, and the engine 2 is kept in a stopped state. Therefore, the driving power can be raised. Thus, in Embodiment 3, since it is possible to release the third clutch mechanism S3, torque of at least one of the motor-generators can be transmitted to the wheels 51 during a state where the engine 2 has been stopped. Specifically, in the case where torque of a motor-generator is transmitted to the wheels 51, the driven or dragged rotation of the engine 2 can be avoided, and therefore decline in the power transmission efficiency can be restrained. Besides, in the case where torque of one of the motor-generators is transmitted to the wheels 51, the driven or dragged rotation of the other motor-generator can be avoided, and therefore decline in the power transmission efficiency can be restrained. Therefore, even in the case where the vehicle 1 tows another vehicle, a towing capability comparable to that of a vehicle that has only one driving power source can be obtained.

Similar to Embodiment 1 and Embodiment 2, Embodiment 3 is constructed so that torques of the motor-generators MG1, MG2 are transmitted to the wheels 51 via the transmission 19. Therefore, since torque is amplified when the rotation speed is reduced by the transmission 19, the maximum required torques of the motor-generators MG1, MG2 can be reduced. Furthermore, since the power distribution device 3 and the transmission 19 are used in combination, the maximum rotation speeds of the motor-generators MG1, MG2 can be reduced by the control of the speed change ratio of the transmission 19.

Furthermore, in Embodiment 3, the power distribution device 3 and the transmission 19 are provided, and the speed change ratios of both the power distribution device 3 and the transmission 19 can be controlled, and the selective switching between the motor-generator that takes reaction force and the motor-generator that is linked to an output element can be performed. Therefore, it is possible to restrain so-called power circulation, that is, a phenomenon in which the motor-generator that takes the reaction force of engine torque is subjected to the power running control (particularly in the reverse rotation direction), and the regenerative control is performed on the motor-generator that is linked to an output element of the power distribution device 3, and electric power obtained through the regenerative control is supplied to the motor-generator that is subjected to the power running control. Therefore, in the case where power is transmitted from the engine 2 to the wheels 51, decline in the power transmission efficiency can be restrained. Furthermore, since in FIG. 9, the power distribution device 3 is made up of a double-pinion planetary gear mechanism, the motor-generators MG1, MG2 are separately disposed on opposite sides of the engine 2 in the alignment charts shown in FIG. 10 and the subsequent figures. Therefore, in the two cases of one or the other of the motor-generators taking the reaction force of engine torque, the magnitudes of the reaction torque can be made substantially equal. Therefore, as the motor-generators MG1, MG2, motor-generators of substantially the same functions and build can be used.

Incidentally, in Embodiment 3, the first clutch mechanism S1, the second clutch mechanism S2 and the third clutch mechanism S3 may be multiplate wet clutches, which are a type of friction clutches, or may also be mechanical meshing clutches with reduced friction loss. Besides, in FIG. 9, it is also possible to dispose the motor-generator MG2 so that it surrounds the outside of the power distribution device 3 (the outside thereof in radial directions about the rotation axis B1). Furthermore, although in FIG. 9, the third clutch mechanism that cuts off the power transmission between the engine 2 and the transmission 19 is disposed between the sun gear 4 and the transmission 19, it is also possible to dispose the third clutch mechanism between the ring gear 5 and the engine 2 or between the carrier 57 and the input shaft 17. Such a construction also achieves substantially the same effects as described above.

Furthermore, although in FIG. 9, the power distribution device 3 is made up of a double-pinion planetary gear mechanism, substantially the same operation and effects as described with reference to FIG. 9 can also be obtained in a vehicle whose power distribution device 3 is made up of a single-pinion planetary gear mechanism as described above in conjunction with Embodiment 1 (FIG. 1) if in the vehicle a third clutch mechanism is disposed between the second-speed driving gear 29 and the sun gear of the input shaft 9. Furthermore, in the construction shown in FIG. 1, it is also possible to provide a third clutch mechanism between the engine 2 and the carrier 7 or provide a third clutch mechanism between the ring gear 5 and the rotor 16 of the motor-generator MG2. In the case where such a construction is adopted, too, substantially the same operation and effects as described above with reference to FIG. 9 can be obtained. Still further, it is also possible to make up the power distribution device 3 shown in FIG. 9 from a Ravigneaux-type planetary gear mechanism. In this case, too, substantially the same effects as described above can be obtained. Furthermore, the correspondence relationship between the construction described in conjunction with Embodiment 3 and the construction of the invention is the same as the correspondence relationship between the constructions of Embodiment 1 and Embodiment 2 and the construction of the invention.

Incidentally, although each of the transmissions shown in FIGS. 1, 8 and 9 is a stepped transmission capable of switching among the four kinds of different speed change ratios stepwise by selectively switching among the shift control modes 1 to 4, it is also possible to execute the example of the control shown in FIG. 3 in a vehicle that has a stepped transmission capable of switching among three kinds of speed change stages or five or more kinds of speed change stages. In this case, shift control modes corresponding in number to the speed change stages are selectable. Furthermore, the example of the control shown in FIG. 3 can also be executed in a vehicle that employs a stepless transmission as the transmission. Incidentally, although in the foregoing embodiments, the switching among a plurality of shift control modes can be performed while the forward travel position has been selected, the transmission may also be a transmission in which the switching among a plurality of shift control modes can be performed while the backward travel position has been selected.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A hybrid driving apparatus comprising:
    a gear mechanism having a first rotating element, a second rotating element and a third rotating element that are linked differentially rotatably;
    an internal combustion engine linked to the first rotating element;
    a first motor-generator linked to the second rotating element;
    a second motor-generator linked to the third rotating element;
    a driven member that transmits power output from an element selected from the first rotating element, the second rotating element, and the third rotating element, of the gear mechanism to a wheel;
    a first power transmission path that power-transmittably connects the first motor-generator and the second rotating element to the driven member;
    a second power transmission path that power-transmittably connects the second motor-generator and the third rotating element to the driven member; and
    a transmission provided on at least one of the first power transmission path and the second power transmission path,
    wherein a clutch mechanism is provided which directly couples the first motor-generator and the second rotating element.

2. The hybrid driving apparatus according to claim 1,
    wherein the transmission has a first intermediate rotating member linked to the second rotating element and the second driving power source, and a second intermediate rotating member linked to the third rotating element and the third driving power source, and
    wherein the first intermediate rotating member and the second intermediate rotating member are coaxially disposed, and
    wherein a rotation axis of the first intermediate rotating member and the second intermediate rotating member, and a rotation axis of the driven member are disposed in parallel, and
    wherein a gear pair that links the first intermediate rotating member and the second intermediate rotating member to the driven member is provided.

3. The hybrid driving apparatus according to claim 1, wherein the gear mechanism is made up so that the first rotating element serves as an input element, and so that one of the second rotating element and the third rotating element serves as a reaction force element and another one of the second rotating element and the third rotating element serves as an output element, and so that a speed change ratio between the rotating element that serves as the input element and the rotating element that serves as the output element is steplessly alterable by a differential operation of the first rotating element, the second rotating element and the third rotating element.

4. The hybrid driving apparatus according to claim 1,
    wherein the gear mechanism is made up of a single-pinion planetary gear mechanism that has a sun gear and a ring gear that are coaxially disposed, and a carrier that holds pinion gears meshed with the sun gear and with the ring gear, and the first rotating element is the carrier, and the second rotating element is the sun gear, and the third rotating element is the ring gear, and
    wherein the transmission has a first intermediate rotating member and a second intermediate rotating member, and the first intermediate rotating member is linked to the sun gear, and the second intermediate rotating member is linked to the ring gear, and
    wherein the first power transmission path is made up by meshing a plurality of first driving gears provided on the first intermediate rotating member and a plurality of first driven gears provided on the driven member, and the second power transmission path is made up by meshing a plurality of second driving gears provided on the second intermediate rotating member and a plurality of second driven gears provided on the driven member, and
    wherein the first power transmission path has a first clutch mechanism that connects one of the plurality of first driving gears to one of the plurality of first driven gears, and the second power transmission path has a second clutch mechanism that connects one of the plurality of second driving gears to one of the plurality of second driven gears.

5. The hybrid driving apparatus according to claim 1,
    wherein the gear mechanism is made up of a double-pinion planetary gear mechanism that has a sun gear and a ring gear that are coaxially disposed, first pinion gears meshed with the sun gear, second pinion gears meshed with the first pinion gears and with the ring gear, and a carrier that supports the first pinion gears and the second pinion gears, and the first rotating element is the ring gear, and the second rotating element is the sun gear, and the third rotating element is the carrier, and
    wherein the transmission has a first intermediate rotating member and a second intermediate rotating member, and the first intermediate rotating member is linked to the sun gear, and the second intermediate rotating member is linked to the carrier, and
    wherein the first power transmission path is made up by meshing a plurality of first driving gears provided on the first intermediate rotating member and a plurality of first driven gears provided on the driven member, and the second power transmission path is made up by meshing a plurality of second driving gears provided on the second intermediate rotating member and a plurality of second driven gears provided on the driven member, and
    wherein the first power transmission path has a first clutch mechanism that connects one of the plurality of first driving gears to one of the plurality of first driven gears, and the second power transmission path has a second clutch mechanism that connects one of the plurality of second driving gears to one of the plurality of second driven gears.

6. The hybrid driving apparatus according to claim 1, wherein both of the first power transmission path and the second power transmission path are respectively provided with gear pairs.

7. The hybrid driving apparatus according to claim 6, wherein a first gear pair is provided on the first power transmission path, and a second gear pair is provided on the second power transmission path, and the speed change ratio selected by the first gear pair and the speed change ratio selected by the second gear pair are different.

8. The hybrid driving apparatus according to claim 1, wherein, when controlling the speed change ratio between rotation speed of the first driving power source and rotation speed of the driven member by controlling the speed change ratio between an input element and an output element of the gear mechanism, the hybrid driving apparatus is capable of executing a control of the speed change ratio of the transmission in parallel with a control of the speed change ratio of the gear mechanism so as to selectively switch between a plurality of drive modes having different control ranges of the speed change ratio between the rotation speed of the first driving power source and the rotation speed of the driven member, and the hybrid driving apparatus has a mode switching manner selection device that selects a first mode switching manner of switching between the plurality of drive modes while keeping constant the rotation speed of the first driving power source.

9. The hybrid driving apparatus according to claim 8, wherein the mode switching manner selection device judges whether a predetermined output of the first driving power source is high or low, and selects the first mode switching manner based on a result of judgment.

10. The hybrid driving apparatus according to claim 9, wherein the mode switching manner selection device is capable of selecting a second mode switching manner that has a characteristic of switching between the plurality of drive modes while raising the rotation speed of the first driving power source, and the mode switching manner selection device selects the first mode switching manner when the output of the first driving power source is high, and selects the second mode switching manner when the output of the first driving power source is low.

11. The hybrid driving apparatus according to claim 1, wherein the first rotating element, the second rotating element and the third rotating element making up the gear mechanism include a sun gear and a ring gear that are coaxially disposed, and a carrier that supports pinion gears meshed with the sun gear and with the ring gear so that the pinion gears are rotatable about own axes thereof and are revolvable.

12. The hybrid driving apparatus according to claim 11, wherein the transmission device is made of a driving gear provided on a first intermediate rotating member, and a driving gear provided on a second intermediate rotating member, and driven gears provided on the driven member, which are respectively meshed with the driving gears, and the second rotating element is the sun gear, and the sun gear and the driving gear are coaxially disposed.

13. The hybrid driving apparatus according to claim 11, wherein the third rotating element is the ring gear, and the third driving power source is provided annularly so as to surround an outside of the ring gear.

14. A control method of a hybrid driving apparatus having:
a gear mechanism that has a first rotating element, a second rotating element and a third rotating element that are linked differentially rotatably;
a first driving power source linked to the first rotating element;
a second driving power source linked to the second rotating element;
a third driving power source linked to the third rotating element;
a driven member that transmits power output from an element of the gear mechanism to a wheel;
a first power transmission path that power-transmittably connects the second driving power source and the second rotating element to the driven member;
a second power transmission path that power-transmittably connects the third driving power source and the third rotating element to the driven member;
a transmission provided on at least one of the first power transmission path and the second power transmission path, a clutch mechanism is provided which directly couples the first driving power source and the first rotating element, which directly couples the second driving power source and the second rotating element, or which directly couples the third driving power source and the third rotating element, the control method comprising:
judging whether a predetermined output of the first driving power source is high or low;
performing a control of the speed change ratio of the gear mechanism based on a result of judgment;
selecting one of a first mode switching manner and a second mode switching manner based on the result of judgment; and
switching the speed change ratio of the transmission based on a result of selection.

15. The control method of the hybrid driving apparatus according to claim 14, wherein in the first mode switching manner, switching between a plurality of drive modes of the transmission is performed while rotation speed of the first driving power source is kept constant.

16. The control method of the hybrid driving apparatus according to claim 14, wherein in the second mode switching manner, switching between a plurality of drive modes of the transmission is performed while rotation speed of the first driving power source is raised.

* * * * *